US012784551B2

(12) United States Patent
D'Ercoli

(10) Patent No.: US 12,784,551 B2
(45) Date of Patent: Nov. 3, 2026

(54) AUTOMATED SHOPPING SUPPORT SYSTEM BASED ON HAND LOCATION AND MOVEMENTS

(71) Applicant: Datalogic IP Tech S.R.L., Calderara di Reno (IT)

(72) Inventor: Francesco D'Ercoli, Bologna (IT)

(73) Assignee: DATALOGIC IP TECH S.R.L., Bologna (IT)

(*) Notice: Subject to any disclaimer, the term of this patent is extended or adjusted under 35 U.S.C. 154(b) by 0 days.

(21) Appl. No.: 18/984,327

(22) Filed: Dec. 17, 2024

(65) Prior Publication Data

US 2026/0170929 A1 Jun. 18, 2026

(51) Int. Cl.
*G07G 1/00* (2006.01)
*G07G 1/01* (2006.01)

(52) U.S. Cl.
CPC ............. *G07G 1/0036* (2013.01); *G07G 1/01* (2013.01)

(58) Field of Classification Search
CPC ............... G07G 1/0036; G06Q 20/321; G06Q 30/0641; G08B 21/0269; G08B 21/0272
USPC ......... 235/375, 383, 385; 340/539.13, 568.1, 340/568.5
See application file for complete search history.

(56) References Cited

U.S. PATENT DOCUMENTS 10,371,786 B1* 8/2019 Orlov .................... G01S 5/0284
10,499,194 B1* 12/2019 Tyagi ...................... H04W 4/02
10,701,515 B2 6/2020 Bottazzi
2017/0278051 A1* 9/2017 Cohn ................... G06Q 10/087
2021/0224883 A1* 7/2021 Shmueli .................. G06F 1/163
2024/0395048 A1* 11/2024 Andhavarapu ........ G06V 20/52

OTHER PUBLICATIONS

Bracelets, Beacons, Barcodes: Wearables in the Global Response to COVID-19 By Katitza Rodriguez, Svea Windwehr, and Seth SchoenJun. 15, 2020 https://www.eff.org/it/deeplinks/2020/06/bracelets-beacons-barcodes-wearables-global-response-covid-19.
Survive the 'Retail Apocalypse' With AWM Smart Shelf 2024 https://www.awm.tech/retail_solutions.html.

* cited by examiner

*Primary Examiner* — Suezu Ellis
(74) *Attorney, Agent, or Firm* — The Juhasz Law Firm

(57) ABSTRACT

A shopping support system includes: a bracelet including an accelerometer detecting linear movements of a hand and/or gyroscope detecting rotational movements of the hand, and that repeatedly wirelessly transmits indications of the linear and/or rotational movements; a set of stationary positioning devices that cooperate with the bracelet to repeatedly exchange wireless triangulation signals, and to measure relative strengths thereof where received; and a processor configured to repeatedly determine a current location of the hand within by repeatedly analyzing the relative strengths of the wireless triangulation signals where received to repeatedly triangulate a current location of the bracelet, repeatedly analyze the indications of linear and/or rotational movements to identify instances of picking up and/or putting down an item offered for purchase; and determine whether the item is being purchased based on changes in the current location of the hand, and on instances of picking up and putting down the one item.

20 Claims, 12 Drawing Sheets

AUTOMATED SHOPPING SUPPORT SYSTEM BASED ON HAND LOCATION AND MOVEMENTS

BACKGROUND

1. Technical Field

The present disclosure relates to an automated shopping support system based on monitoring hand position and movements.

2. Description of the Related Art

The use of automation in physical store locations to partially automate the physical checkout procedure in an effort to speed up the purchasing of items is well known. By way of example, it is well known to provide customer-operated self checkout systems in which customers are entrusted with using scanning devices to scan indicia carried on surfaces of objects to identify what items are being purchased, and in what quantities, as part of automatically generating a receipt and accepting payment. Additionally, in some of such checkout systems, it is known to additionally provide platforms upon which the customer may package items within bags, where such platforms integrate a scale to weigh those bags as a double check of items being purchased.

Unfortunately, in spite of such efforts at automating physical checkout procedures, the very fact of having a physical checkout procedure, at all, is widely known to be an unwelcome part of the customer shopping experience. The very fact of having a physical checkout procedure frequently creates a bottleneck in which customers often find themselves required to stand in long lines leading to a distinct checkout area within a physical store where the physical checkout procedure takes place. This can add considerably to customer frustration, since the line, itself, is a time-consuming process just to reach the checkout area where more time will be consumed to undergo the physical checkout procedure.

In response, there is a growing effort to use technology to entirely do away with having a physical checkout procedure by replacing it with a virtual checkout procedure that does not require the physical participation of customers. Such efforts often entail the use of cameras to visually monitor display areas within a physical store location where various items offered for purchase are positioned for customers to pick up and put into carts, followed by the use of machine vision technology to recognize the items that are picked up and put into carts, as well as to associate each cart to an individual shopper. In this way, a shopper is able to enter a physical store, physically pick up items that they want to buy, and then walk out of the physical store with those items, while payment for those items is automatically made in a virtual checkout procedure using a form of payment pre-selected by that shopper.

Unfortunately, such an approach of using technology to do away with a physical checkout procedure, entirely, is often both cumbersome and expensive to implement. To ensure that the actions of each customer in the vicinity of each display area remain visible to at least one of the cameras despite instances in which camera views are likely to be blocked by the customers, themselves, it is often necessary to install numerous cameras at numerous different locations throughout a physical store. However, the quantity of cameras required to do so can quickly become prohibitively expensive. Also, considerable computing resources are required to support the execution of machine vision algorithms needed to recognize the items being offered for sale, and to recognize the actions of customers that lead to sales of those items in real time based on motion video received from each of those numerous cameras. However, the provision of such computing resources, as well as the amount of electric power they require, can also quickly become prohibitively expensive.

Thus, there exists a need to provide an automated shopping support system that monitors shopping activity in a physical store in a cost effective and resource efficient manner to enable a physical checkout procedure requiring customer participation to be replaced with a virtual checkout procedure.

BRIEF SUMMARY

Technologies are described for providing an automated shopping support system that monitors shopping activity to provide a virtual checkout procedure.

A shopping support system includes a bracelet including at least one of an accelerometer to detect linear movements of a hand within a physical store setting and a gyroscope to detect rotational movements of the hand, wherein: the bracelet is configured to be carried on a wrist associated with the hand; and the bracelet is configured to repeatedly wirelessly transmit indications of at least one of the linear movements of the hand and the rotational movements of the hand. The shopping support system also includes a set of stationary positioning devices configured to cooperate with the bracelet to repeatedly exchange wireless triangulation signals with the bracelet and to measure relative strengths of the wireless triangulation signals where received. The shopping support system further includes at least one processor in communication with the bracelet and with the set of stationary position device via a network, wherein the at least one processor is configured to perform operations including: repeatedly determine a current location of the hand within the physical store setting by repeatedly analyzing the relative strengths of the wireless triangulation signals where received to repeatedly triangulate a current location of the bracelet; repeatedly analyze the indications of at least one of the linear movements of the hand and the rotational movements of the hand to identify instances of picking up and putting down one item offered for purchase within the physical store setting; and determine whether the one item is being purchased based on changes in the current location of the hand, and based on the instances of picking up and putting down the one item.

A method includes detecting at least one of linear movements of a hand with an accelerometer of a bracelet or rotational movements of the hand with a gyroscope of the bracelet, wherein: the bracelet is configured to be carried on a wrist associated with the hand; and the bracelet is configured to repeatedly wirelessly transmit indications of at least one of the linear movements of the hand and the rotational movements of the hand. The method also includes repeatedly exchanging wireless triangulation signals between the bracelet and a set of stationary positioning devices; measuring relative strengths of the wireless triangulation signals where received; repeatedly determining, by at least one processor, a current location of the hand within the physical store setting by repeatedly analyzing the relative strengths of the wireless triangulation signals where received to repeatedly triangulate a current location of the bracelet; repeatedly analyzing, by the at least one processor, the indications of at least one of the linear movements of the hand and the rotational movements of the hand to identify instances of picking up and putting down one item offered for purchase within the physical store setting; and determining, by the at least one processor, whether the one item is being purchased based on changes in the current location of the hand, and based on the instances of picking up and putting down the one item.

DETAILED DESCRIPTION

Figure 1:
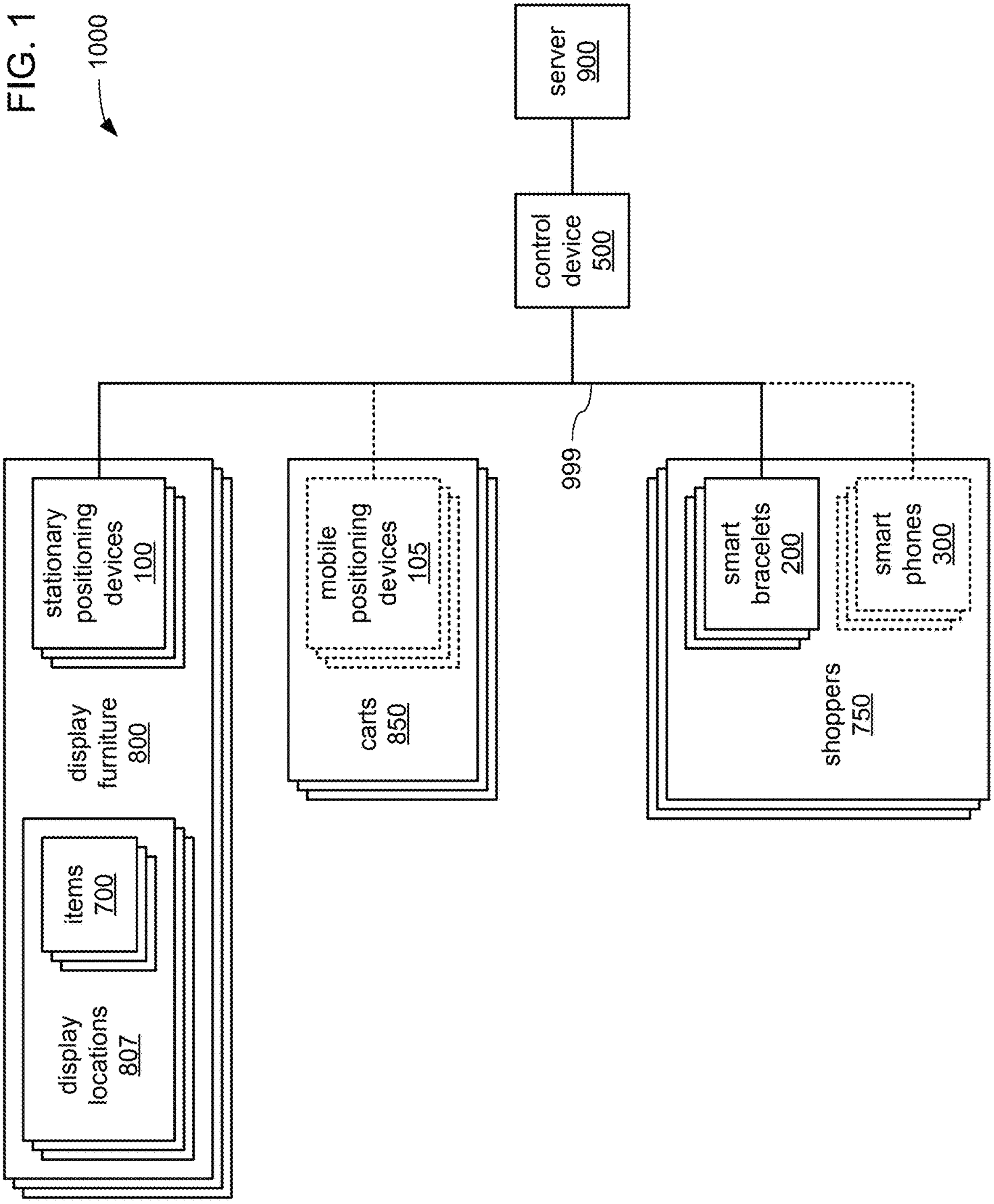
FIG. 1 is a block diagram of an embodiment of an automated shopping support system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is an apparatus implementing a system and method for monitoring hand position and movements to automate to identify items being purchases for virtual check-out at a physical store setting.

A shopping support system includes a bracelet including at least one of an accelerometer to detect linear movements of a hand within a physical store setting and a gyroscope to detect rotational movements of the hand, wherein: the bracelet is configured to be carried on a wrist associated with the hand; and the bracelet is configured to repeatedly wirelessly transmit indications of at least one of the linear movements of the hand and the rotational movements of the hand. The shopping support system also includes a set of stationary positioning devices configured to cooperate with the bracelet to repeatedly exchange wireless triangulation signals with the bracelet and to measure relative strengths of the wireless triangulation signals where received. The shopping support system further includes at least one processor in communication with the bracelet and with the set of stationary position device via a network, wherein the at least one processor is configured to perform operations including: repeatedly determine a current location of the hand within the physical store setting by repeatedly analyzing the relative strengths of the wireless triangulation signals where received to repeatedly triangulate a current location of the bracelet; repeatedly analyze the indications of at least one of the linear movements of the hand and the rotational movements of the hand to identify instances of picking up and putting down one item offered for purchase within the physical store setting; and determine whether the one item is being purchased based on changes in the current location of the hand, and based on the instances of picking up and putting down the one item.

A method includes detecting at least one of linear movements of a hand with an accelerometer of a bracelet or rotational movements of the hand with a gyroscope of the bracelet, wherein: the bracelet is configured to be carried on a wrist associated with the hand; and the bracelet is configured to repeatedly wirelessly transmit indications of at least one of the linear movements of the hand and the rotational movements of the hand. The method also includes repeatedly exchanging wireless triangulation signals between the bracelet and a set of stationary positioning devices; measuring relative strengths of the wireless triangulation signals where received; repeatedly determining, by at least one processor, a current location of the hand within the physical store setting by repeatedly analyzing the relative strengths of the wireless triangulation signals where received to repeatedly triangulate a current location of the bracelet; repeatedly analyzing, by the at least one processor, the indications of at least one of the linear movements of the hand and the rotational movements of the hand to identify instances of picking up and putting down one item offered for purchase within the physical store setting; and determining, by the at least one processor, whether the one item is being purchased based on changes in the current location of the hand, and based on the instances of picking up and putting down the one item.

Figure 2:
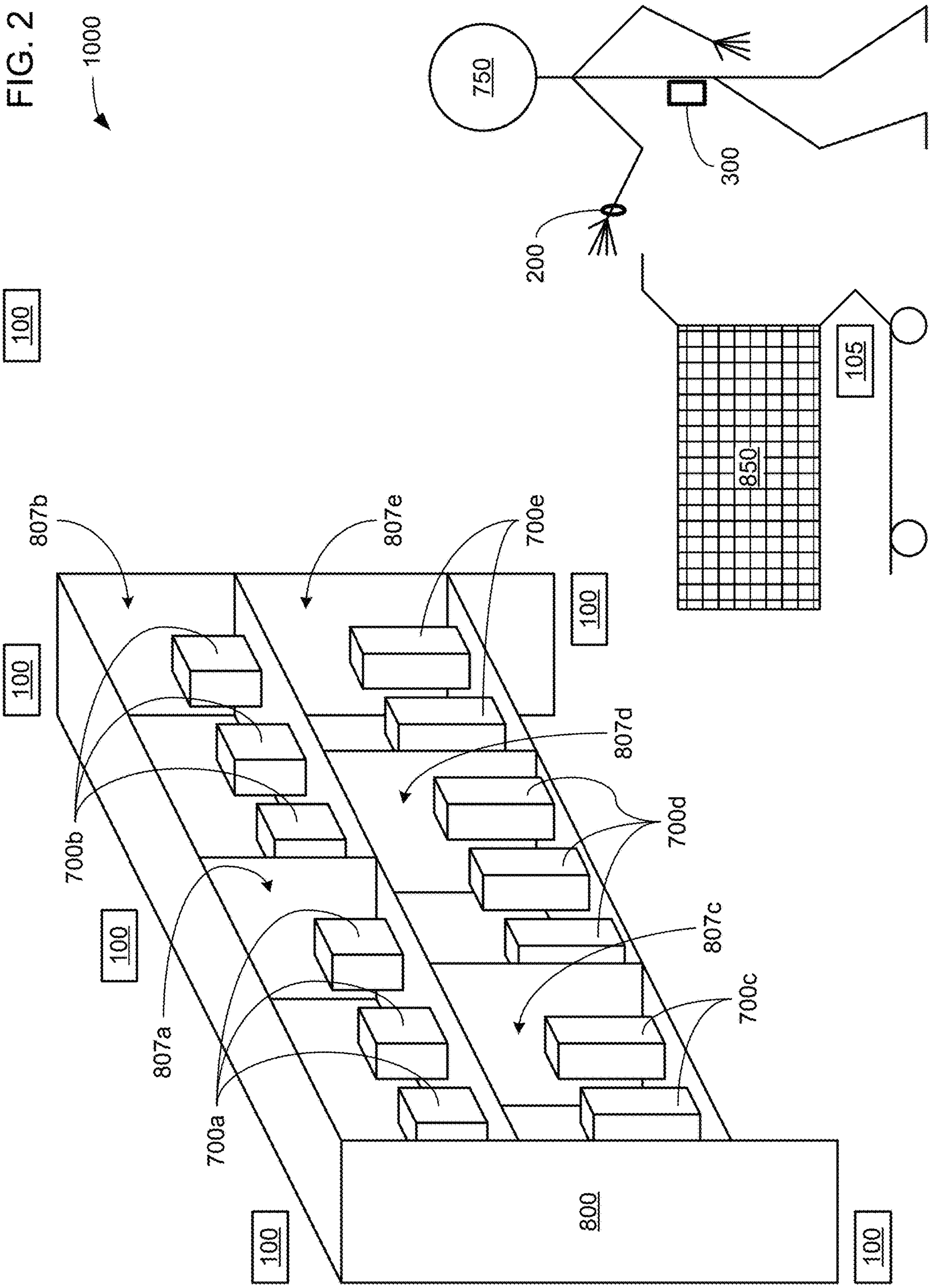
FIG. 2 is a perspective view of use of the embodiment of the automated shopping support system of FIG. 1.

FIG. 1 depicts an example embodiment of an automated shopping support system 1000, and FIG. 2 depicts an example of use of the automated shopping support system in a physical store setting. As depicted, the automated shopping support system 1000 includes multiple stationary positioning devices 100, multiple mobile positioning devices 105, multiple smart bracelets 200, multiple smart phones 300, a control device 500, and/or a server 900. Also, one or more of these devices 100, 105, 200, 300, 500 and/or 900 may be interconnected by a network 999, wherein at least a portion of the network 999 may be based on one or more forms of wireless signaling technology.

As part of installing the shopping support system 1000 within a physical store setting, multiple ones of the stationary positioning devices 100 may be positioned about each piece of display furniture 800 on which various items 700 for purchase may be displayed in a manner that makes them physically accessible for being physically handled by customers 750. As will be explained in greater detail, as part of performing such an installation, at least one or more subsets of the stationary positioning devices 100 may cooperate to triangulate their positions within the physical store setting relative to each other to build a virtual map of the physical store setting in preparation for use of the shopping support system 1000. As will also be explained in greater detail, as part of using the automated shopping support system 1000, the stationary positioning devices 100 and the smart bracelets 200 may cooperate to repeatedly triangulate the position of each hand of a customer 750 that carries one of the smart bracelets 200.

Also as part of installing the shopping support system 1000, a mobile positioning device 105 may be installed on each physical cart 850 that a customer may use within the physical store setting as part of shopping for items 700 therein. As will be explained in greater detail in embodiments that include the mobile positioning systems 105, during use of the shopping support system 1000, the positioning devices 100 and 105 may cooperate to repeatedly triangulate the position of each cart 850 within the store setting. This may create a dual-layered form of triangulation in which, as part of using the automated shopping support system 1000, the mobile positioning devices 105 may join in the cooperation between the stationary positioning devices 100 and the smart bracelets 200 to provide greater precision in repeatedly triangulating the position of each hand of a customer 750 that carries one of the smart bracelets 200.

It should be noted, and as will also be explained in greater detail, such cooperation among the stationary positioning devices 100, the mobile positioning devices 105 and/or the smart bracelets 200 may be necessary to perform such triangulation operations, in some embodiments, it may be the processing resources of the control device 500 and/or the smart phones 300 carried by at least some of the customers 750 may be used support such triangulation operations. More precisely, it may be that the control device 500 and/or the smart phones 300 are employed to perform at least a subset of the calculations required by such triangulation operations as an approach to reducing the consumption of limited supplies of electric power that may be stored within batteries incorporated into one or more of the devices 100, 105 and/or 200.

As will also be explained in greater detail, each of the smart bracelets 200 may include one or more accelerometers and/or one or more gyroscopes that may be used to sense various movements of the hand of a customer 750. Such hand movements may then be employed as inputs to any of a variety of forms of machine learning to detect combinations of movement consistent with picking up and/or putting down one of the objects 700. In a manner similar to the performance of triangulation operations, it may be that the processing resources of the control device 500 and/or the smart phones 300 may be used to support such detection of such combinations of movements. More precisely, the machine learning used to detect such combinations of such movements may be instantiated and used within the control device 500 and/or within the smart phones 300 as an approach to reducing the consumption of limited supplies of electric power that may be stored within batteries incorporated into the smart bracelets 200.

It should be further noted that FIG. 2 depicts a deliberately simplified example of an installation of the automated shopping support system 1000 with just one depicted piece of display furniture 800, just one cart 850, just one customer 750, a relatively small quantity of items 700 offered for purchase, and a relatively small quantity of positioning devices 100 and 105. Such a deliberately simplified example is depicted and described herein to reduce visual clutter for sake of ease of understanding, and should not be taken as limiting. More specifically, what is depicted, described and claimed herein may be applied to other embodiments of an automated shopping support system 100 installed within other physical store settings in which there may be a far greater quantity and variety of items 700 displayed on a greater quantity of pieces of display furniture 800 around which a far greater quantity of positioning devices 100 may be installed. Further, it is envisioned that there may be a far greater quantity of smart bracelets worn on the wrists of a far greater quantity of customers 750, each of which may be using a far greater quantity of carts 850 that may be each be equipped with a mobile positioning device 105.

It should additionally be noted that, although the single depicted piece of display furniture 800 is depicted and discussed herein as being a piece of display shelving, other embodiments are possible in which one or more pieces of display furniture 800 about which one or more stationary positioning devices 100 may be installed may include various other types of display furniture. By way of example, the pieces of display furniture 800 about which one or more stationary positioning devices 100 may be positioned may include display table(s) atop which items 700 may be placed, peg board(s)from which items 700 may be suspended on hooks, and/or clothing rack(s) from which items 700 may be hung on hooks and/or hangers. It should also additionally be noted that, although the use of physical carts 850 incorporating wheels and to which mobile positioning devices 105 may be attached is depicted and described herein, other embodiments are possible in which baskets and/or still other containers may be used by customers 750 to aid in moving about items 700 that customers 750 have selected for purchase. Such alternative containers may be used by customers 750 in addition to or in lieu of carts 850, and each such alternative container may have a mobile positioning device 105 installed thereon.

Figure 3A:
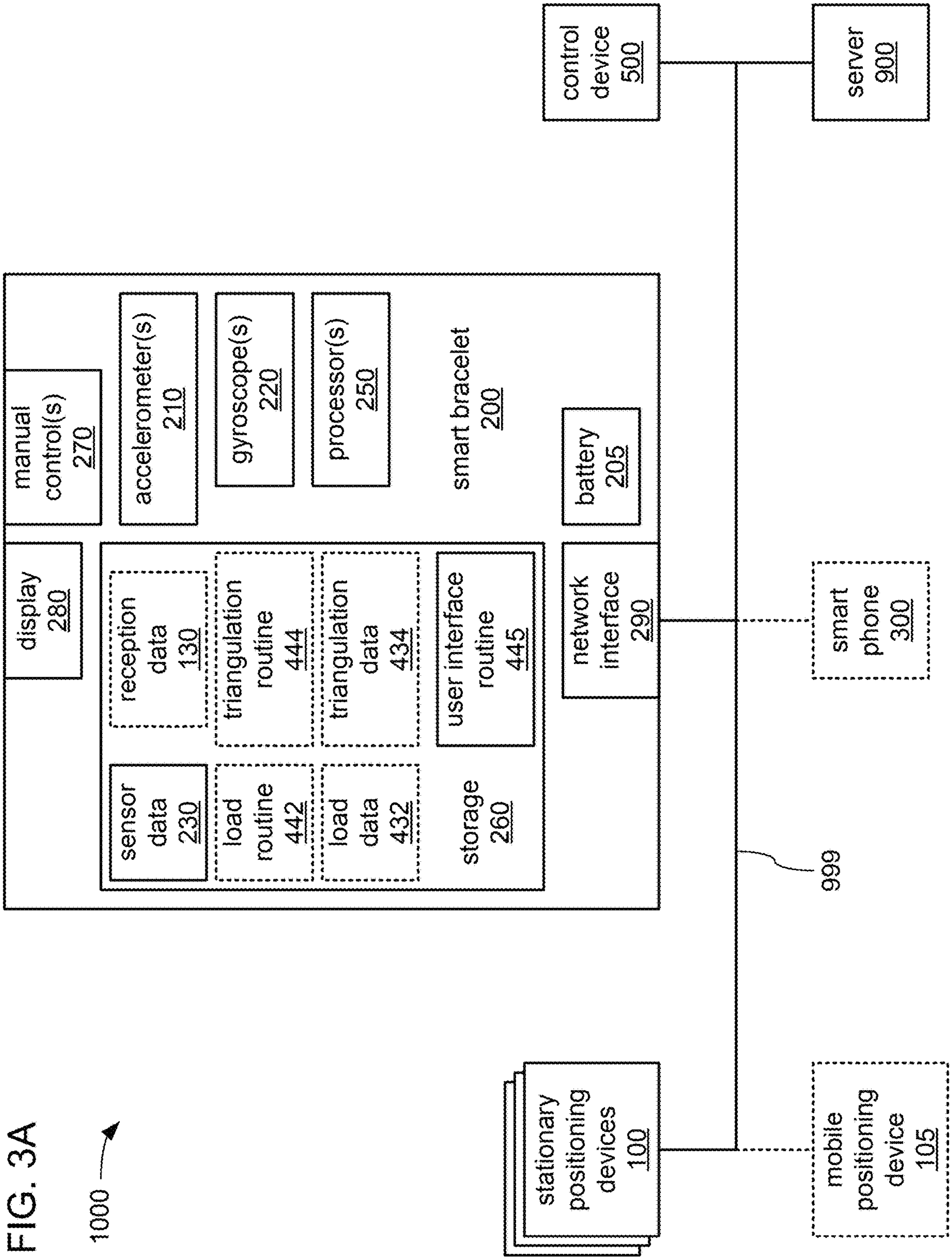
FIGS. 3A, 3B and 3C provide detailed block diagrams of embodiments of different devices of the automated shopping support system of FIG. 1.
Figure 3B:
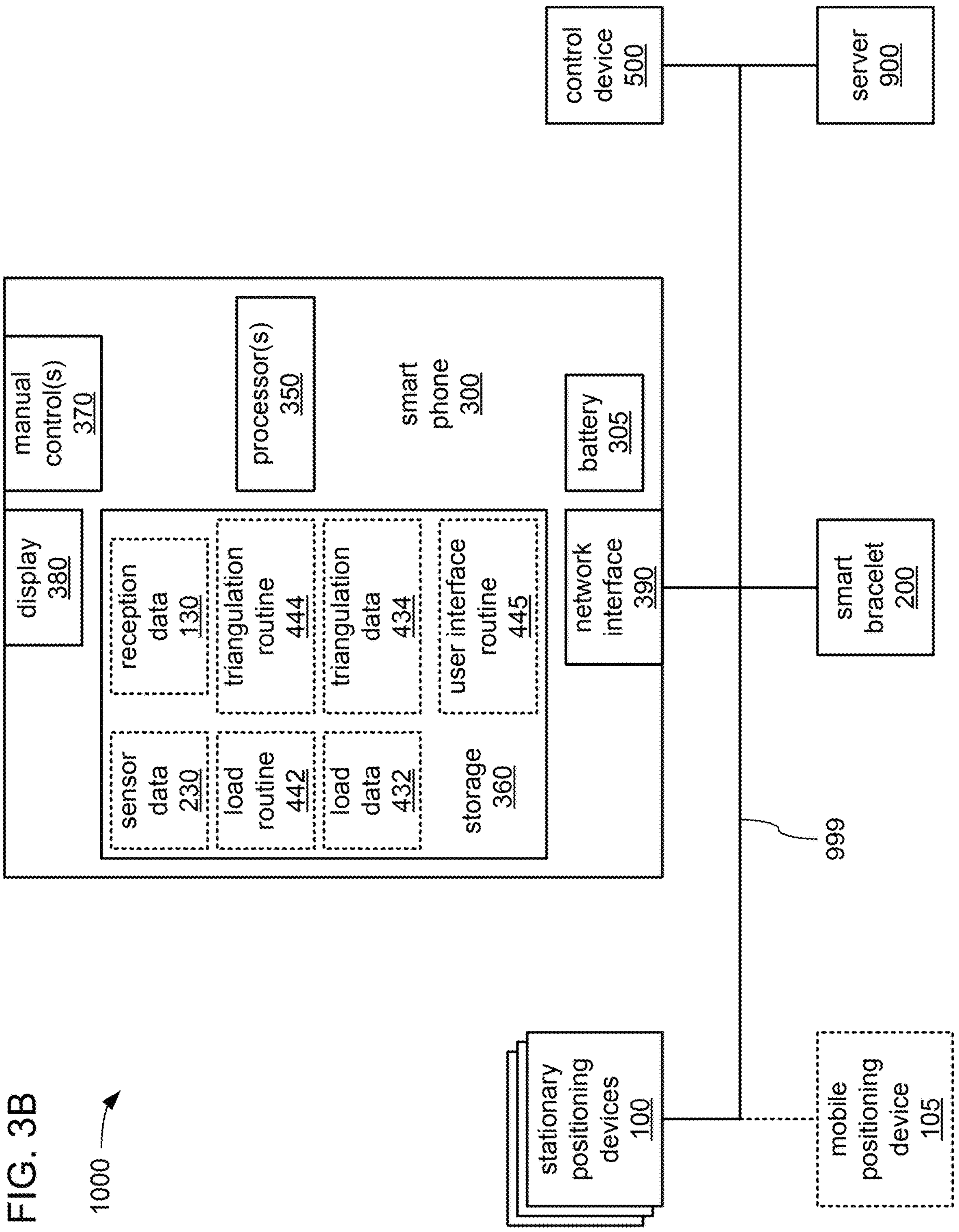
Figure 3C:
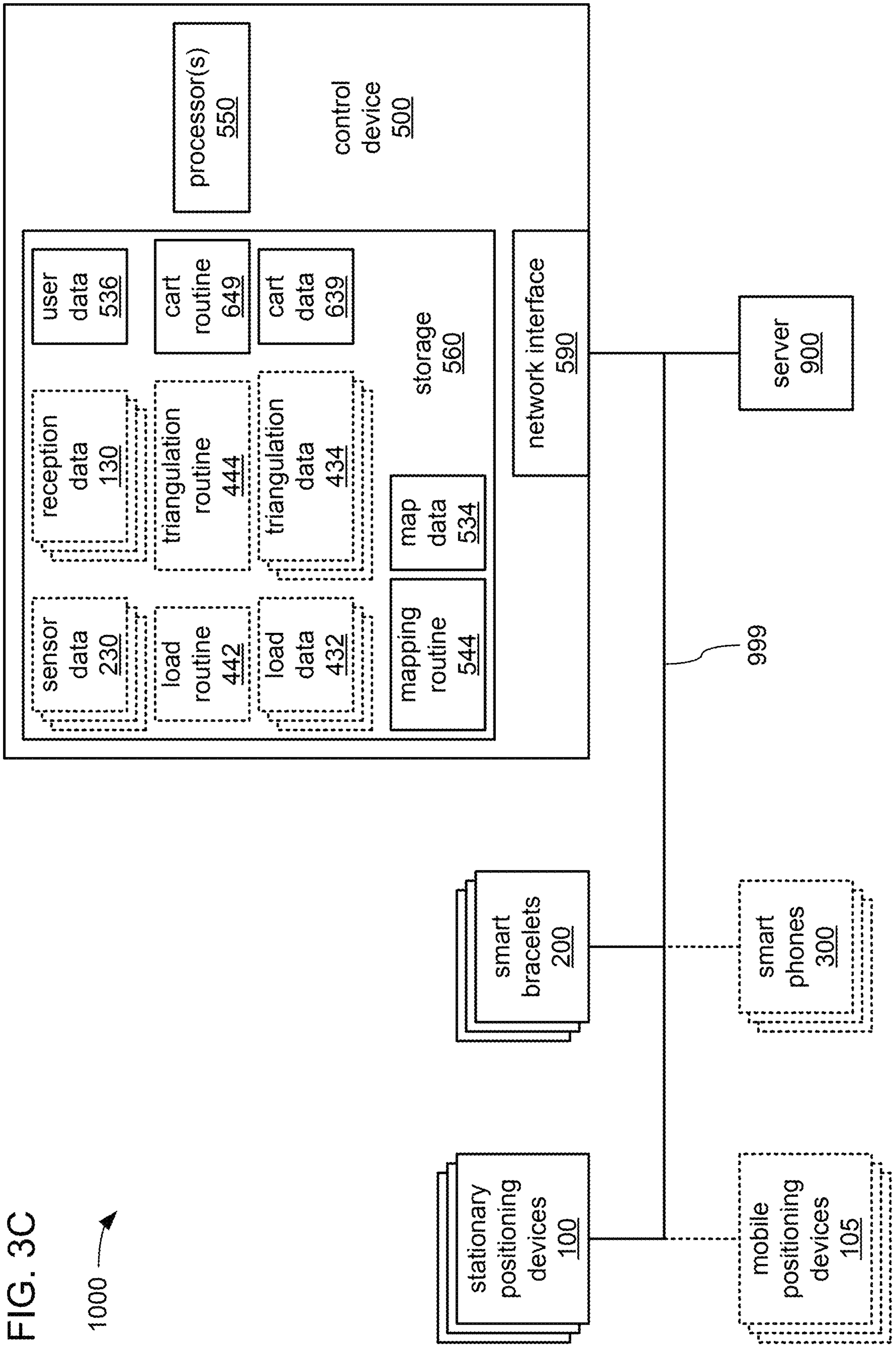
Figure 4A:
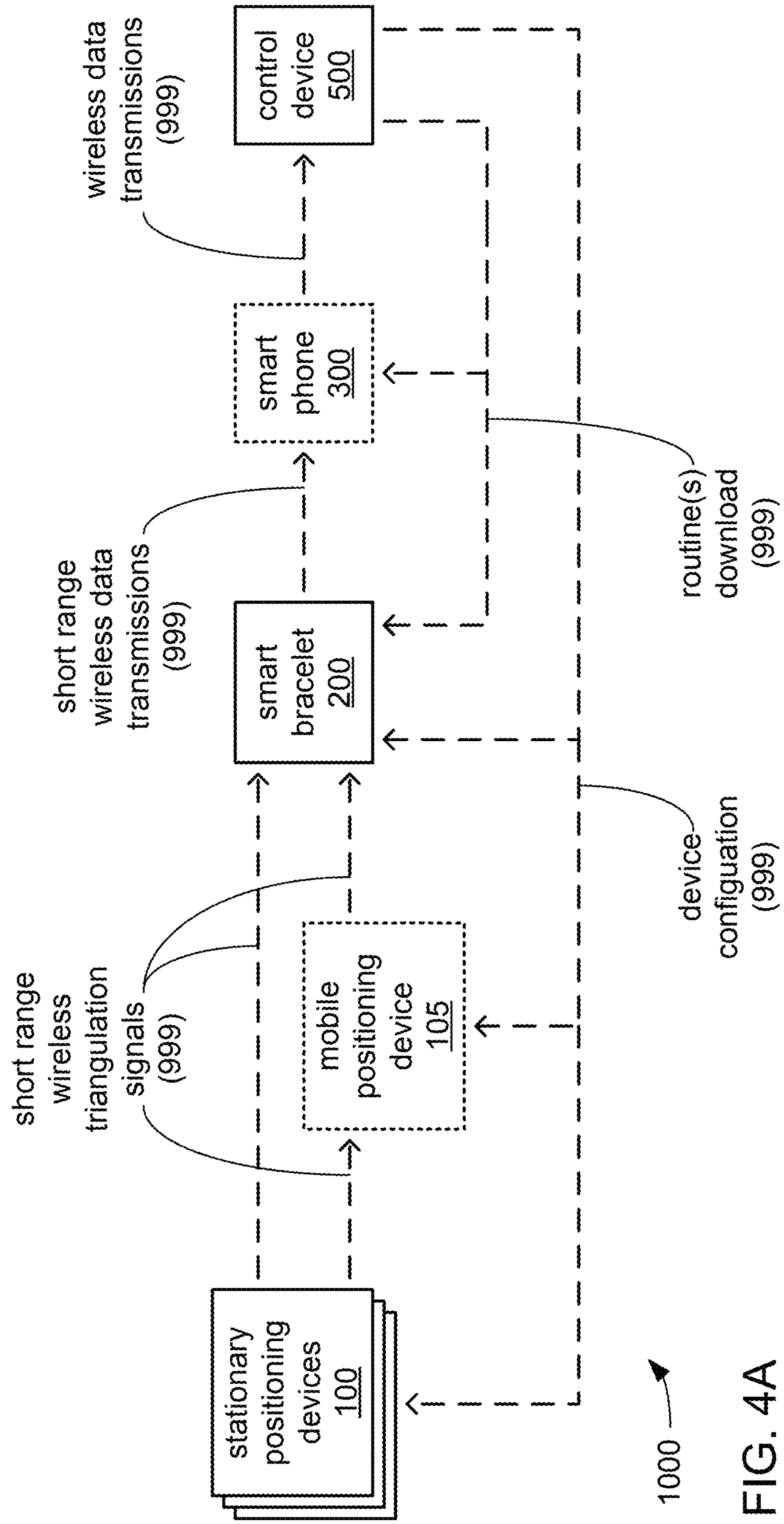
FIGS. 4A and 4B provide block diagrams of differing embodiments of cooperation among devices of the automated shopping support system of FIG. 1.
Figure 4B:
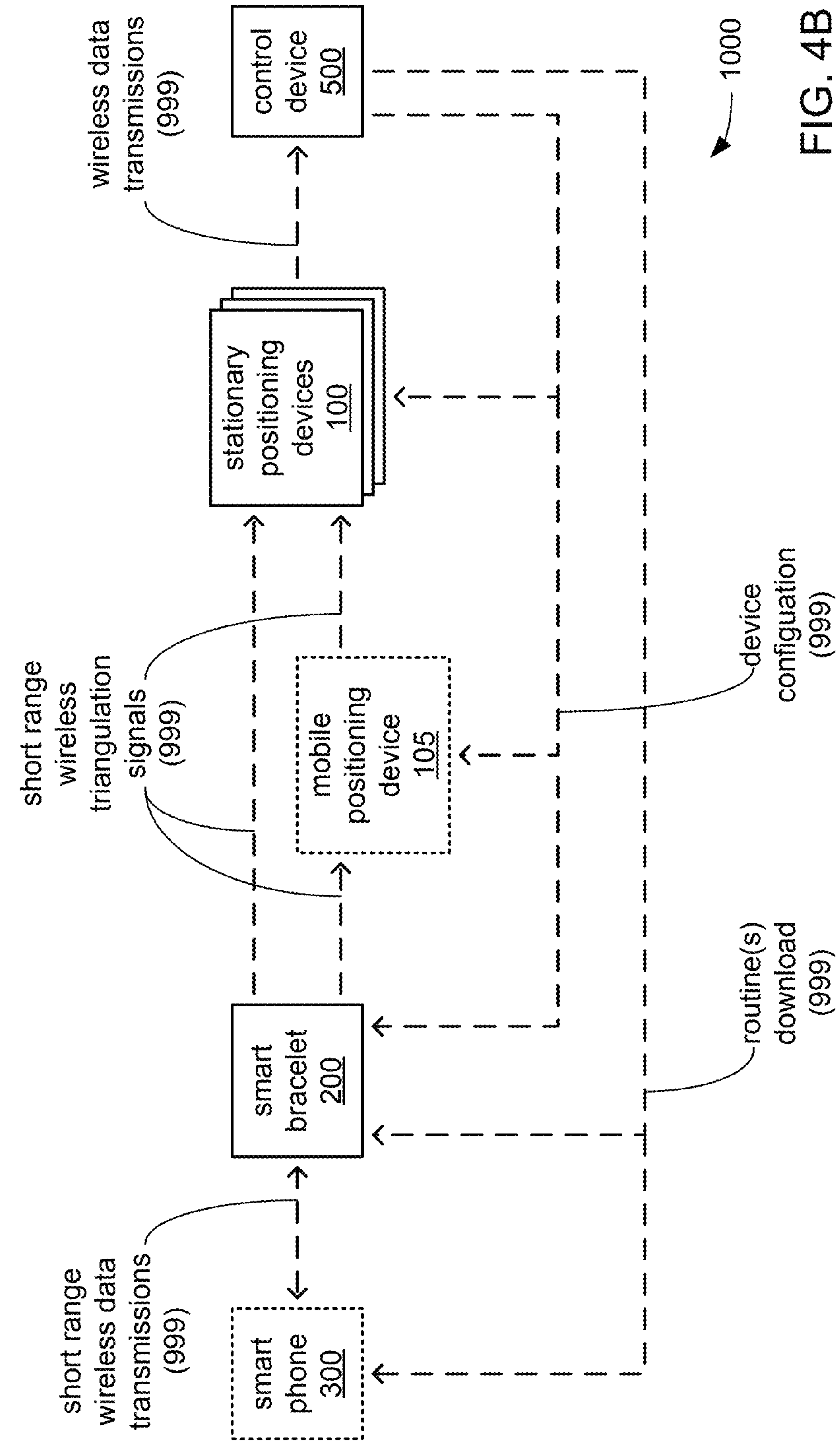

FIGS. 3A, 3B and 3C, together, depict aspects of each of the devices 200, 300 and 500 of the automated shopping support system 1000 in greater detail. FIGS. 4A and 4B, depict two differing embodiments of triangulation of the smart bracelets 200.

Turning to FIG. 3A, each of the smart bracelets 200 may include a battery 205, one or more accelerometers 210, one or more gyroscopes 220, one or more processors 250, a storage 260, one or more manually-operable controls 270, a display 280, and/or a network interface 290. The accelerometer(s) 210, the gyroscope(s) 220, the storage 260, the manually-operable control(s) 270, the display 280, and/or the network interface 290 may each be communicatively coupled to the one or more processors 250 to exchange data therewith through the exchange of electrical, optical, magnetic and/or other signals through one or more buses and/or other form of interconnect.

The storage 260 may store sensor data 230, which may include repeatedly updated indications of linear and/or rotational movements of the smart bracelet 200 that may have been detected by the accelerometer(s) 210 and/or the gyroscope(s) 220. The storage 260 may also store load data 432 which may include repeatedly updated indication(s) of loading events in which the customer 750 wearing the depicted smart bracelet 200 has picked up an item 700, and/or unloading events in which the same customer 750 has put down an item 700. As will be explained in greater detail, the load data 432 may be derived from the sensor data 230 via execution of a load routine 442, which the storage 260 may also store.

The storage 260 may store reception data 130, which may include repeatedly updated indications of the relative strengths of wireless transmissions exchanged among a subset of the stationary positioning devices 100, a mobile positioning device 105, and/or the depicted smart bracelet 200 for purposes of triangulating the location of the depicted smart bracelet 200 within a physical store setting. Accordingly, the storage 260 may also store triangulation data 434, which may include repeatedly updated indication(s) of the location of the depicted smart bracelet 200 relative to at least the subset of the stationary positioning device 100 and/or a mobile positioning device 105. As will be explained in greater detail, the triangulation data 434 may be derived from the reception data 130 via execution of a triangulation routine 444, which the storage 260 may also store.

The storage 260 may, alternatively or additionally, store a user interface routine 445.

Turning to FIG. 3B, each of the smart phones 300 may include a battery 305, one or more processors 350, a storage 360, one or more manually-operable controls 370, a display 380, and/or a network interface 390. The storage 360, the manually-operable control(s) 370, the display 380, and/or the network interface 390 may each be communicatively coupled to the one or more processors 350 to exchange data therewith through the exchange of electrical, optical, magnetic and/or other signals through one or more buses and/or other form of interconnect.

The storage 360 may store the reception data 130, the sensor data 230, the load data 432, and/or the triangulation data 434. The storage 360 may also store the load routine 442, the triangulation routine 444, and/or the user interface routine 445.

Turning to FIG. 3C, the control device 500 may include one or more processors 550, a storage 560, and/or a network interface 590. The storage 560, and/or the network interface 590 may each be communicatively coupled to the one or more processors 550 to exchange data therewith through the exchange of electrical, optical, magnetic and/or other signals through one or more buses and/or other form of interconnect.

The storage 560 may store multiple instances of the sensor data 230, and/or the load data 432 concerning loading events and/or unloading events associated with smart bracelets 200 worn by multiple customers 750. Similarly, storage 560 may store multiple instances of the reception data 130, and/or the triangulation data 434 concerning the positions of smart bracelets 200 worn by multiple customers 750.

The storage 560 may store map data 534, which may include indications of locations of stationary positioning device 100 within a physical store setting that may have been derived during installation of the automated shopping support system 1000. The map data 534 may also include repeatedly updated indications of locations of mobile positioning devices 105 and/or smart bracelets 200 within the same physical store setting that may be derived from the multiple instances of triangulation data 434. As will be explained in greater detail, the map data 534 may be derived via execution of a mapping routine 544, which the storage 560 may also store.

The storage 560 may store user data 536 that may include information concerning each customer 750, including payment information needed to perform a virtual checkout in response to each occasion of one of the customers 750 entering a physical store setting in which the automated shopping support system 1000 is installed to purchase one or more items 700. Accordingly, the storage 560 may also store cart data 639 indicative of virtual shopping carts currently maintained for customers currently within the physical store setting in preparation for performing the virtual checkout for each such customer 750 who completes their shopping. As will be explained in greater detail, the cart data 639 may be generated and/or maintained via execution of a cart routine 649, which the storage 560 may also store.

Referring back to all of FIGS. 3A-C, each of the routines 442, 444, 445, 544 and 649 may incorporate a sequence of instructions operative on one or more of the processors 250, 350 and/or 550 of the devices 200, 300 and/or 500, respectively. However, exactly which processors 250, 350 and/or 550 are used to execute each of the routines 442, 444, 445, 544 and/or 649 may depend on the manner in which various functions are assigned to each of the devices 200, 300 and/or 500 in various different embodiments of the automated shopping support system 1000.

Turning to the detection of loading events and unloading events, as previously discussed, the accelerometer(s) 210 and/or the gyroscope(s) 220 within each of the smart bracelets 200 may be used to detect linear and/or rotational movements of a hand and/or wrist of a customer 750, and a neural network or other form of machine learning may be used to detect combinations of such movements that are consistent with a loading event in which a customer 750 picks up an item 700, and/or are consistent with an unloading event in which a customer 750 puts down an item 700.

In some embodiments, due to the sensor data 230 being generated within the smart bracelets 200, it may be deemed desirable to implement, within each smart bracelet 200, the neural network or other form of machine learning used to analyze the movements indicated in the sensor data 230 to identify loading events and/or unloading events. In this way, the sensor data 230 indicative of detected movements need not be transmitted to other device(s), and may be used as input to an execution of the load routine 442 by processor(s) 250 within the smart bracelets 200 to generate instances of the load data 432 indicative of identified loading events and/or unloading events within the smart bracelets 200. It may then be the instances of the load data 432 generated within each of the smart bracelets 200 that are transmitted to other device(s). In such embodiments in which the processor (s) 250 incorporate neuromorphic components (e.g., memristors) necessary to implement a neural network and/or other form of machine learning in hardware in a manner that may be more efficient than a software-based implementation, it may be that the consumption of electric power from the battery 205 is able to be minimized to a degree that is deemed sufficient to assign such functionality to the smart bracelets 200.

However, in other embodiments, it may be that a desire to make the smart bracelets 200 relatively small and/or lightweight results in the battery 205 not being large enough to have sufficient capacity to support implementing such a neural network or other form of machine learning within the smart bracelets 200. In such embodiments, it may be that the load routine 442 is not executed within the smart bracelets 200, such that it is not stored within the storage 260. Instead, it may be that customers 750 are required to download the load routine 442 into their smart phones 300. It may also be that each customer 750 is further required to pair their smart phone 300 with one of the smart bracelets 200 to enable each smart bracelet 200 to transmit the sensor data 230 that is generated therein to the corresponding smart phone 300. It may be deemed desirable to use the greater storage capacity of the batteries 305 of the smart phones 300 that are likely to be carried by the customers 750 to implement the needed form of machine learning therein by the processor(s) 350 thereof executing the load routine 442. Thus, it may be within the smart phones 300 owned by the customers 750 that instances of the load routine 442 are executed to identify loading events and/or unloading events and generate indications of those events within instances of the load data 432 that may be transmitted to the control device 500.

Alternatively, in still other embodiments, it may be deemed desirable to implement such a neural network or other form of machine learning within the control device 500. By way of example, it may be that the processor(s) 550 of the control device 500 are able to provide the necessary processing resources (e.g., with neuromorphic components within the processor(s) 550, and/or with software) to support identifying combinations of movements within multiple repeatedly updated instances of the load data 432 received from the smart bracelets 200. Such multiple instances of the load data 432 may be repeatedly received from the smart bracelets 200 either directly or relayed through corresponding ones of the smart phones 300 to which the smart bracelets 200 may be paired. Thus, in such other embodiments, it may be that the load routine 442 is not executed within either of the smart bracelets 200 or the smart phones 300, and accordingly, not stored within either of the storages 260 or 360, respectively.

Regardless of which one(s) of the devices 200, 300 and/or 500 are used to implement the form of machine learning used to identify the combinations of detected movements that are consistent with loading events and/or unloading events, the manner in which the chosen form of machine learning is trained may vary among different embodiments of the automated shopping support system 1000. In some embodiments, it may be that an artificial neural network and/or other form of machine learning is trained to identify loading events and unloading events using a data set made up of detected movements associated with numerous different people. As those familiar with the biomechanics of the human body will readily recognize, while many aspects of the musculoskeletal structures of the hands and wrists of human beings have considerable similarities, there can also be small, but significant variations thereamong. Thus, where it is deemed desirable to avoid specifically training individual implementations of machine learning to recognize loading events and unloading events based on the detected movements of a hand and/or wrist of individual customers 750, it may be necessary to use training data based on detected movements of a great many people to achieve relatively high accuracy.

Turning to the triangulation of the locations of the smart bracelets 200, as previously discussed, at least subsets of the stationary positioning devices 100 may cooperate with the smart bracelets 200 to use measures of relative signal strength in exchanges of wireless triangulation signals to repeatedly derive the current location of each smart bracelet 200 that is currently within a physical store setting. However, as those skilled in the art will readily recognize, in different embodiments of the automated shopping support system 1000, such triangulation techniques may entail the use of either wireless triangulation signals received by each smart bracelet 200 from multiple other devices, or wireless triangulation signals transmitted by each smart bracelet 200 to multiple other devices. Again, the choice of which signaling approach to use may be based on what is deemed to be desirable in view of the limited energy storage capacity of the batteries 205 of the smart bracelets 200.

In some embodiments, and turning briefly to FIG. 4A, in addition to FIGS. 3A-C, it may be deemed desirable for a smart bracelet 200 to receive wireless triangulation signals from at least a subset of the stationary positioning devices 100 as an approach to limiting the transmissions that are to be made from the smart bracelet 200 to those associated with detecting loading events and/or unloading events. Such wireless triangulation signals may be relatively short range signals that may adhere to any of a variety of widely accepted industry standards, such as Bluetooth promulgated by the Bluetooth Special Interest Group of Kirkland, Washington, USA. Thus, such short range wireless triangulation signals may be exchanged through wireless point-to-point links of the network 999 that may be dynamically instantiated and uninstantiated between each of the smart bracelets 200 and differing ones of the stationary positioning devices 100 become close enough for their signals to be received. Further, the wireless triangulation signals transmitted by each of the stationary positioning devices 100 may include an identifier that uniquely identifies it and/or its location within a physical store setting.

Within each smart bracelet 200, execution of the triangulation routine 444 may cause the processor(s) 250 to store indications of relative strengths and/or other details of such received signals (e.g., identifiers and/or locations of the stationary positioning devices 100 from which they are received) as instances of the reception data 130. The processor(s) 250 of that smart bracelet 200 may then analyze those indications to repeatedly derive the current location of the smart bracelet 200 relative to at least the stationary positioning devices 100 from which those signals were received, and to store indications of those current locations as instances of the triangulation data 434. The processor(s) 250 may then operate the network interface 290 to transmit such instances of the triangulation data 434 onward to the smart phone 300 to which the smart bracelet 200 has been paired, also using relatively short range wireless signaling to minimize electric power consumption. In this way, the smart phone 300, with its larger capacity battery 305, may be relied upon to use longer range signaling to relay the instances of the triangulation data 434 onward to the control device 500. These transmissions to the smart phone 300 and/or to the control device 500 may also include an identifier that uniquely identifies the smart bracelet 200, and/or may also convey instances of the sensor data 230 and/or the load data 432, depending on which of the devices 200, 300 or 500 executes the load routine 442 to perform the analysis of movements of the smart bracelet 200.

Alternatively, it may be deemed desirable to further reduce the consumption of electric power within the smart bracelet 200 by not executing the triangulation routine 444 within the smart bracelet 200, and by simply transmitting the reception data 130 to the corresponding smart phone 300 and/or to the control device 500. Thus, the triangulation routine 444 may be executed within the corresponding smart phone 300 or the control device 500. Again, such transmission to the smart phone 300 and/or to the control device 500 may also include an identifier that uniquely identifies the smart bracelet 200, and/or may also convey instances of the sensor data 230 and/or the load data 432, depending on which of the devices 200, 300 or 500 executes the load routine 442 to perform the analysis of movements of the smart bracelet 200.

Additionally, as previously discussed, and as also depicted in FIG. 4A, it may be that the triangulation of each smart bracelet 200 is also based on relatively short range wireless triangulation signals that are also transmitted by at least the mobile positioning device 105 that may be carried by the cart 850 (see FIGS. 1-2) that may be used by the same customer 750 who wears that smart bracelet 200. As previously discussed, the current location of each mobile positioning device 105 within a physical store setting may also need to be triangulated to enable its use in triangulating the current location of a smart bracelet 200. In a manner similar to the smart bracelets 200, it may be deemed desirable to minimize the consumption of electric power stored within batteries within each mobile positioning device 105 by simply relaying indications of relative strengths of wireless triangulation signals received by each mobile positioning device 105 onward to another device. Thus, the short range wireless triangulation signals transmitted by a mobile positioning device 105 to a smart bracelet 200 may serve the dual purposes of being another signal by which the current location of the smart bracelet 200 may be triangulated, and of conveying data indicative of relative strengths of signals received by the mobile positioning device 105. Additionally, such signals transmitted by a mobile positioning device 105 may include an identifier that uniquely identifies the mobile positioning device 105.

Within the corresponding smart bracelet 200, indications may be included in instances of the reception data 130 of the relative strength of the triangulation signal received from the mobile positioning device 105, as well as the indications transmitted by the mobile positioning device 105 of the relative strengths of the triangulation signals that it received from stationary positioning devices 100. Thus, as previously discussed, each of the mobile positioning devices 105 may participate in a form of dual-layered triangulation by which the accuracy of the triangulation of corresponding smart bracelets 200 may be increased.

In other embodiments, and turning briefly to FIG. 4B, in addition to FIGS. 3A-C, it may be deemed desirable for a smart bracelet 200 to transmit wireless triangulation signals to at least a subset of the stationary positioning devices 100 as an alternate approach to limiting the consumption of the electrical power stored by its battery 205. More precisely, the smart bracelet 200 may transmit a single repeating and/or ongoing short range signal for at least stationary positioning devices 100 that are close enough to receive it. This single repeating and/or ongoing short range transmission may include an identifier that uniquely identifies the smart bracelet 200. Alternatively or additionally, in embodiments in which the load routine 442 is not executed within the smart bracelet 200, this single repeating and/or ongoing short range transmission may also convey instances of the sensor data 230. Thus, such a signal may serve both as a short range wireless triangulation signal and as the wireless communications signal that provides indications of detected movements of the smart bracelet 200. In this way, the need for the smart bracelet 200 to also receive signals from other devices may be at least minimized.

As an alternative to the smart bracelet 200 simply relaying the sensor data 230, it may be that the processor(s) 250 of the bracelet 200 are caused, by executing the load routine 442, to implement a neural network or other form of machine learning to analyze the indications of detected movements in the instances of the sensor data 230 to identify combinations of movements consistent with loading events and/or unloading events. Again, indications of such identified events may then be stored within instances of the load data 432, and it may be those instances of the load data 432 that are transmitted within the single short range triangulation signal that is transmitted by the smart bracelet 200.

Regardless of the exact content of this single signal from the smart bracelet 200, it may be received by multiple ones of the stationary positioning devices 100. Each of those stationary positioning devices 100 may relay, to the control device 500, instances of the reception data 130 that include indications of having received this signal, along with the contents of this signal, measurements of the signal strength with which this signal was received, and an identifier that uniquely identifies the stationary positioning device 100. Within the control device 500, such information within such received instances of the reception data 130 may be stored within the storage 560. Processor(s) 550 of the control device 500 may then be caused, by execution of the triangulation routine 444, to use such instances of the reception data 130, along with the map data 534 specifying the locations of at least the stationary positioning devices 100, to repeatedly derive the current location of each smart bracelet 200 within a physical store setting.

Additionally, as previously discussed, and as also depicted in FIG. 4B, it may be that the triangulation of each smart bracelet 200 is also based on at least one mobile positioning device 105 also receiving the signal output by the smart bracelet 200. Again, the current location of each mobile positioning device 105 attached to a cart 850 (or other form of container used for shopping) within a physical store setting may also need to be triangulated to enable its use in triangulating the current location of a smart bracelet 200. Thus, in a manner somewhat similar to what was described in reference to FIG. 4A, each mobile positioning device 105 may both receive and transmit short range wireless triangulation signals. However, in FIG. 4B, such signals that are received are those transmitted by smart bracelets 200, and such signals that are transmitted by each mobile positioning device 105 are received by stationary positioning devices 100 that are within range. The short range wireless triangulation signal received by a mobile positioning device 105 may include an identifier of the smart bracelet 200 that transmitted it, and/or may convey data concerning loading events and/or unloading events. The short range wireless triangulation signal output by the mobile positioning device 105 may include the content of the received signal, and may additionally include an identifier of the mobile positioning device 105 and/or may include an indication of the strength of the received signal.

Referring to both FIGS. 4A and 4B, in addition to FIGS. 3A-C, regardless of the exact details of the wireless triangulation signals exchanged among the devices 100, 105 and 200 during use of the automated shopping support system 1000, other signals may be exchanged between the control device 500 and various ones of the devices 100, 105 and/or 200 during installation of the system 1000 within a physical store setting. Such other signals may include various wireless transmission settings, the assignment of unique identifiers to each device 100, 105 and/or 200, and/or commands to trigger the performance of various installation-related operations by one or more of the devices 100, 105 and/or 200.

By way of example, during placement of the stationary positioning devices 100 at various locations about the pieces of display furniture 800 throughout a physical store setting, processor(s) 550 of the control device 500 may be caused, by execution of the mapping routine 544 to operate the network interface 590 to communicate with each of the stationary positioning devices 100 to cause the triangulation of each. More specifically, exchanges of short range wireless triangulation signals may be caused to occur among various subsets of the stationary positioning devices 100 to triangulate the relative locations of each of the stationary positioning devices 100 relative to others. In so doing, indications of the results of such triangulations may be transmitted back to the control device 500, where the processor(s) 500 may be caused to use such results to derive a virtual map of the relative positions of the stationary positioning devices 100 throughout the physical store setting, and such a virtual map may be stored as the map data 534.

Alternatively or additionally, in various embodiments, there may also be one or more executable routines to download into smart bracelets 200 and/or into smart phones 300. By way of example, where smart phones 300 carried by customers 750 are relied upon to analyze movements of smart bracelets 200 to identify loading events and/or unloading events, a copy of the load routine 442 may be downloaded into smart phones 300.

Returning to FIGS. 3A-C, the batteries 205 and/or 305 may be any of a variety of types of electrical power storage component, including and not limited to, a battery made up of one or more cells that may be rechargeable and/or may be removable. Also, the batteries 205 and/or 305 may be based on any of a variety of electrical power storage technologies, including and not limited to, nickel-cadmium, nickel metal hydride (NiMH), lithium-ion, lithium polymer, sodium-ion, etc.

Each of the processor(s) 250, 350 and/or 550 may each include any of a wide variety of processors, microcontrollers, gate-array logic devices, etc. that may incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processor(s) 250, 350 and/or 550 may each be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the processor(s) 250, 350 and/or 550 may each incorporate one or more core components, one or more graphics processing unit (GPU) components, and/or one or more single-instruction multiple-data (SIMD) components to provide any of a variety of processing architectures for performing any of a variety of operations. Each of the one or more core components, the one or more GPU components, and/or the one or more SIMD components may, themselves, employ different processing architectures supporting different portions of instruction sets to perform different operations. By way of example, each of the one or more core components may support a larger and more complex instruction set than the one or more GPU components and the one or more SIMD component, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may be realized with sets of multiple operands supported in side-by-side lanes of a set of SIMD registers. However, the one or more GPU components, and the one or more SIMD components may not support branching instructions. As a result, in executing instructions, the operation and use of the one or more GPU components and/or of the one or more SIMD components may be controlled by the one or more core components.

The storages 260, 360 and/or 560 may each be based on any of a variety of volatile storage technologies, including and not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storages 260, 360 and/or 560 may each be based on any of a variety of non-volatile storage technologies.

The one or more manually-operable controls 270 and/or 370 may include any of a wide variety of input components that able to be manually operated (e.g., operated with one or more digits of a hand), including and not limited to, buttons, lever and/or rocker switches, force-sensitive transducers, optical and/or ultrasound-based motion sensors, touch-sensitive and/or proximity-sensitive solid state input devices, rotary dial control, slide lever controls, etc. The display 280 may be based on any of a wide variety of display technologies, including and not limited to, a liquid crystal display (LCD), an electro-luminescent (EL) display, a gas plasma display, a light-emitting diode (LED) display, etc. Each of such technologies may be used to provide a two-dimensional (2D) array of pixels that may be selectively illuminated and/or configured with a selectable color to display any of a variety of images, including photographic images, animated images, computer-generated graphical images, textual images, etc. In some embodiments, it may be that the manually-operable controls 270 and the display 280 are combined such that the display 280 is a touch screen.

The network interfaces 290, 390 and/or 590 may each employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 290, 390 and/or 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
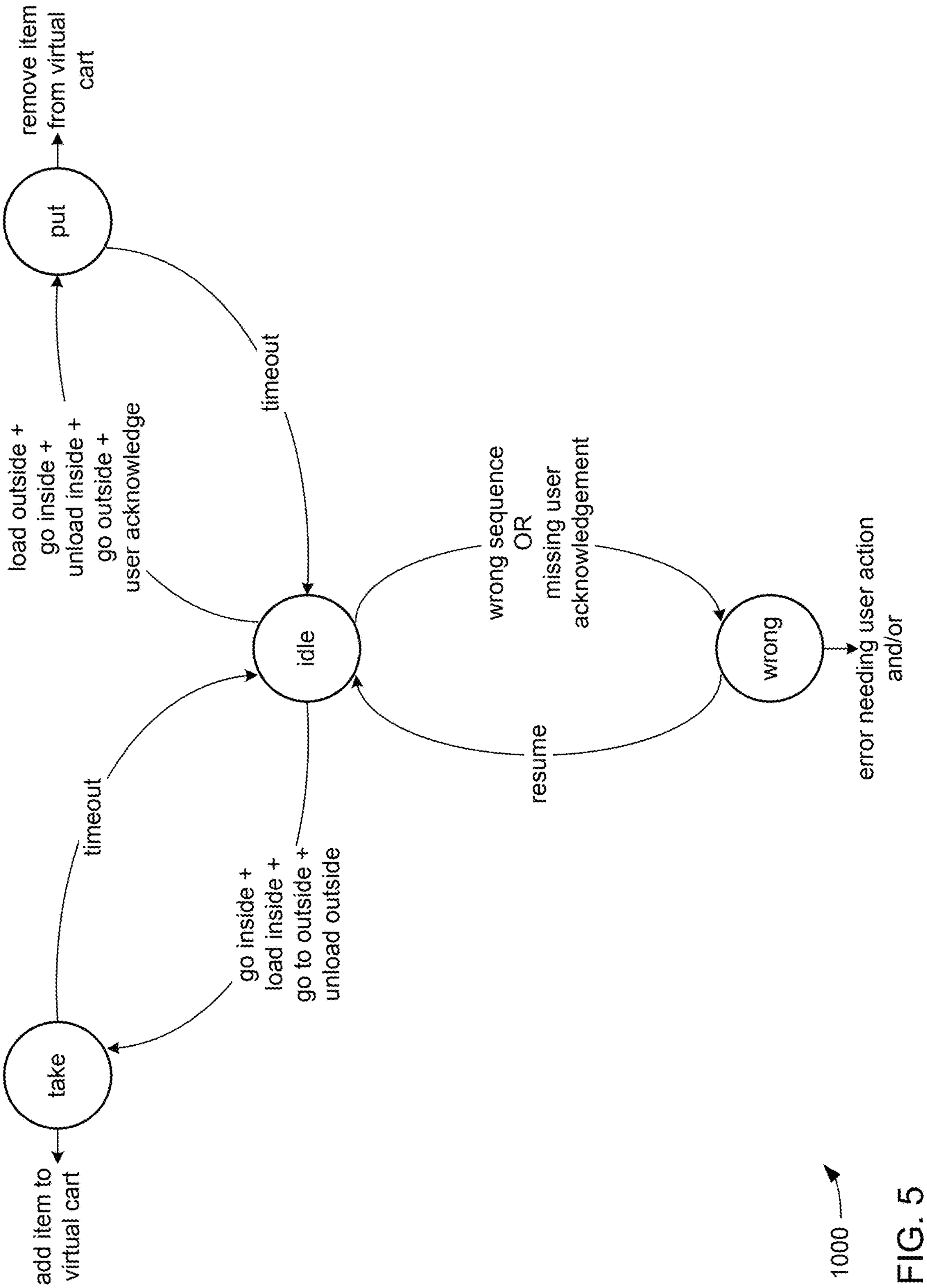
FIG. 5 is a state diagram of an embodiment of user interaction states of the automated shopping support system of FIG. 1.

FIG. 5 provide a state diagram of an embodiment of a set of user interaction states of the automated shopping support system 1000 when used to assist a customer 750 in shopping within a physical store setting. As depicted, there are three states of active interaction with a customer 750 that center about a single state of inactivity.

Each of the three active interaction states, "take", "put" and "wrong", may be entered into as a result of analyses of combinations of indications of movement of a hand of a customer within a physical store setting. Again, such movements include movements to change the location of the hand within the physical store setting (i.e., movements that are detected by repeated triangulation as changing the location of a smart bracelet 200 within the physical store setting), and movements of the hand within a location that are consistent with either a loading event or an unloading event (i.e., relatively small movements of the smart bracelet 200 that are detected as linear and/or rotational accelerations).

Referring to FIGS. 1-2 and 3C, in addition to FIG. 5, for each customer smart bracelet 200 that is worn within a physical store setting by a customer 750 who shops therein, the processor(s) 550 of the control device 500 may be caused by execution of at least the cart routine 649 to analyze the indications of movement of that smart bracelet 200 to generate and maintain a separate virtual cart within the cart data 639 that mirrors what that customer 750 does with a physical cart 850 as part of such shopping. More precisely, for each one of those smart bracelets 200, it is intended that the contents of such a virtual shopping cart mirror the contents of the corresponding physical cart 850, including mirroring each instance of the corresponding customer 750 adding an item 700 to the contents of the physical cart 850 and removing an item 700 therefrom.

Again, for each smart bracelet 200 that is worn within a physical store setting by a customer 750 who shops therein, indications of such movements about the interior of the store setting that are detected by triangulation, and indications of such smaller movements consistent with loading events and unloading events, may be stored within the control device 500 within instances of the triangulation data 434 and of the load data 432, respectively. Again, during use of the automated shopping support system 1000, repeated updating of such indications of such movement may entail repeated updating of such instances of the data 434 and 432 within the storage 560, either as a result of repeatedly receiving new instances of each of the data 434 and/or 432 from other devices 100, 105, 200 and/or 300, and/or as a result of repeatedly generating new instances of each of the data 434 and/or 432 within the control device 500.

It should be noted that such indications of movement of each smart bracelet 200 may be time stamped and/or otherwise associated with the passage of time to enable such indications of movement to be analyzed over a timescale. In this way, instances of changes in movement and a temporal order of individual movements may be identified as part of determining what actions a customer 750 is taking as part of shopping within a physical store setting, based on those movements over that timescale. It should also be noted that the indications of detected movements are intended to be frequent enough as to ensure that important changes in direction of movement, and movements consistent with picking up and/or putting down items 700 are not missed.

As depicted in FIG. 1, the depicted example piece of display furniture 800 may be a piece of shelving having distinct display areas 807*a* through 807*e* at which different items 700*a* through 700*e*, respectively, may be offered for purchase. As previously discussed, multiple stationary positioning devices 100 maybe installed about the piece of display furniture 800 to enable the location of a smart bracelet 200 relative to the piece of display furniture 800 to be triangulated with a relatively high degree of accuracy. Indeed, it is intended that movement of a hand of the depicted customer 750 relative to the piece of display furniture 800 (detected as movement of the depicted smart bracelet 200 relative to the piece of display furniture 800) be able to be detected with sufficient accuracy as to enable the entry of that hand into any one of the display areas 807*a-e* to be distinguished from entry of that hand into any other of the display areas 807*a-e*.

Figure 6A:
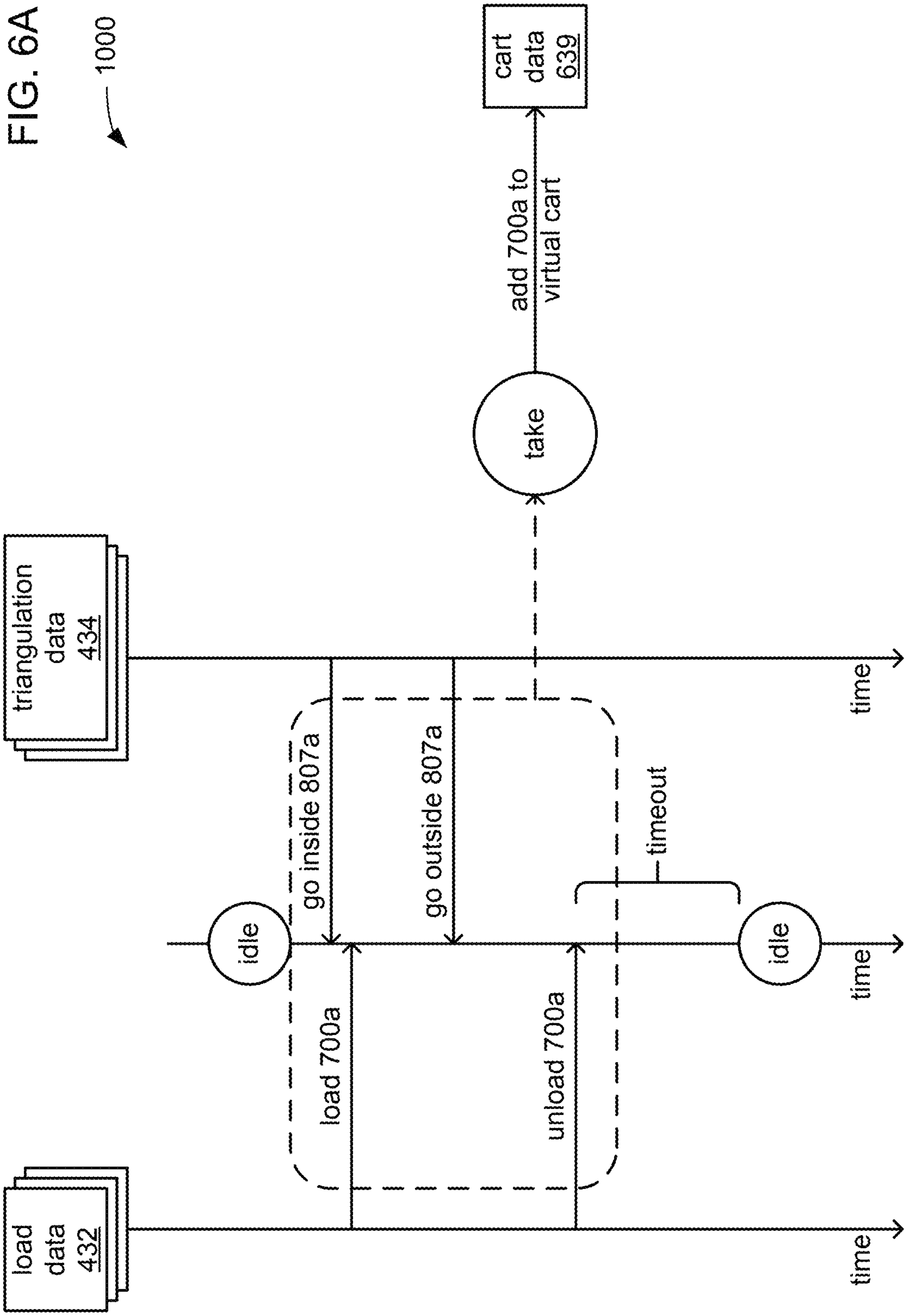
FIGS. 6A, 6B, 6C and 6D provide timelines of different examples of user interaction with the automated shopping support system of FIG. 1.

As depicted in FIG. 5, the "take" state is entered into as a result of a determination, that may be made by processor(s) 550 of the control device 500, that a customer 750 has picked up an item 700 from where it was positioned in a display area 807 of piece of display furniture 800, and has put that item 700 within a cart 850 that is in use by that customer 750. FIG. 6A (in conjunction with FIG. 1) depicts a specific example of this determination arising from a combination of indications of actions that include a movement of the depicted hand of the depicted customer 750 (i.e., detected as movement of a smart bracelet 200 worn on the wrist of that hand) into display area 807*a*, followed by a set of movements of the hand that are consistent with picking up an item 700*a*, followed by a movement of that hand out of the display area 807*a*, and followed by a set of movements of that hand that are consistent with putting down the item 700*a* within the depicted cart 850. As also depicted, the resulting entry into the "take" state entails a determination that the customer 750 has acted to purchase the item 700*a* by acting to put it in the corresponding physical cart 850. In response, the item 700*a* is added to the virtual cart for that customer.

Figure 6B:
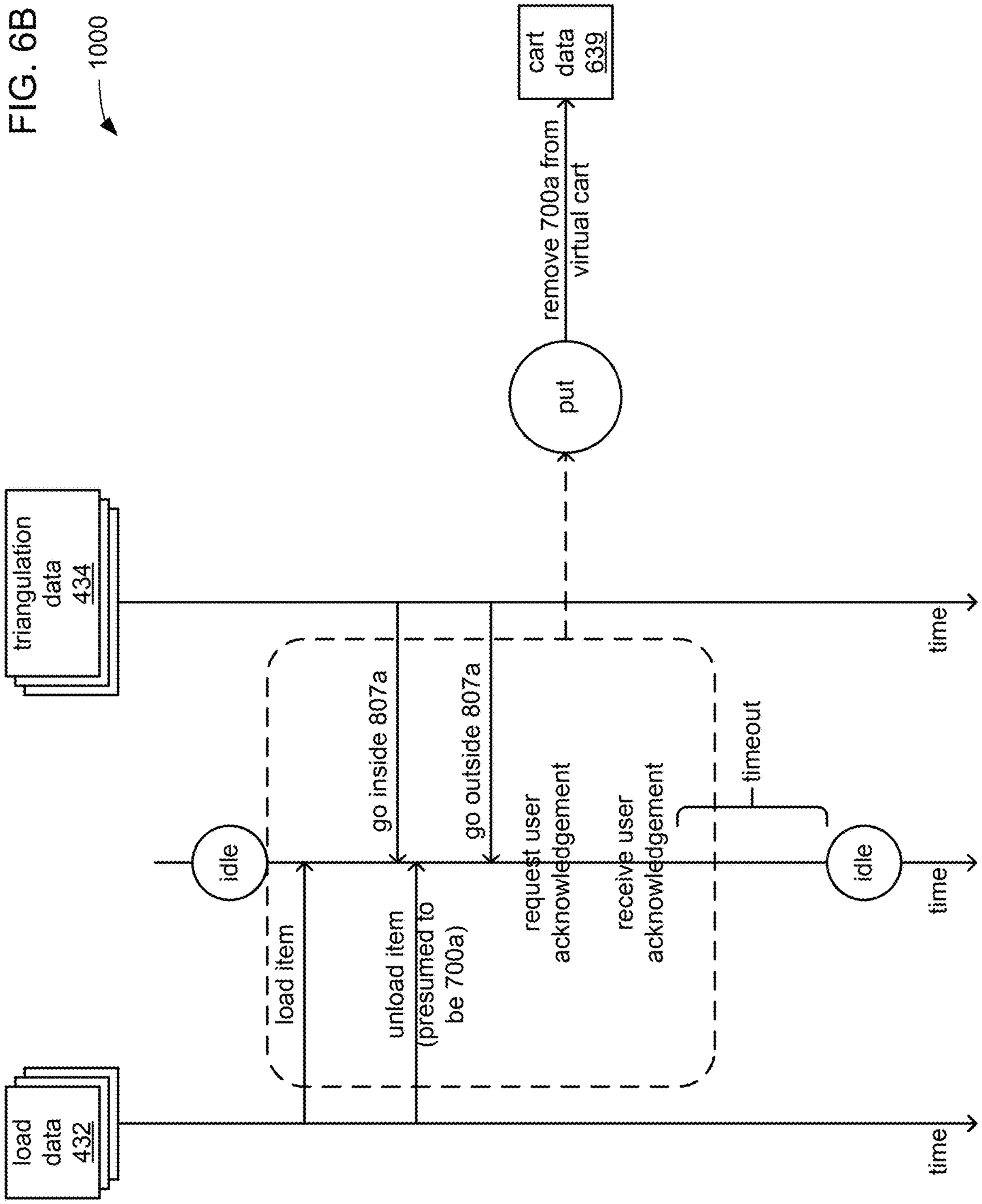

Returning to FIG. 5, the "put" state is entered into as a result of a determination, that may be made by processor(s) 550 of the control device 500, that a customer 750 has taken an item 700 out of a cart that is in use by that customer 750, and has put that item 700 back to where it was positioned in a display area 807 of piece of display furniture 800. FIG. 6B (in conjunction with FIG. 1) depicts a specific example of this determination arising from a combination of indications of actions that include a set of movements of the depicted hand of the depicted customer 750 that are consistent with picking up an item, followed by a movement of the hand into display area 807*a*, followed by a set of movements of the hand that are consistent with putting down the item 700, and followed by a movement of that hand out of the display area 807*a*. It may be that the customer 750 was earlier determined to have picked up an item 700*a* from within the display area 807*a* and put it down within a cart 850 that is in use by the customer 750, and this may lead to an assumption that the item 700 that is put down within the display area 807*a* must be the earlier picked up item 700*a*.

However, regardless of whether such conditions exist that might make such an assumption reasonable, it may be that processor(s) 550 of the control device 500 are caused by execution of the cart routine 649 to respond to such a sequence of detected events by cooperating through the network 999 with the smart bracelet 200 worn by the customer 750 to cause the use of the display 280 thereof (see FIG. 3A) to present a request that the customer 750 confirm that they have changed their mind about purchasing the item 700*a*, and have returned it to the display area 807*a*. As depicted, the customer 750 may respond to this request by operating the one or more manually-operable controls 270 of the smart bracelet to provide input that confirms their return of the item 700*a* to the display area 807*a*, thereby leading to a determination that the customer 750 is not purchasing the item 700*a*. As also depicted, the resulting entry into the "put" state entails a determination that the customer 750 has acted to not purchase the item 700*a* by acting to remove it from the corresponding physical cart 850 and put it back in the display area 807*a*. In response, the item 700*a* is removed from the virtual cart for that customer.

Returning to FIG. 5, the "wrong" state is entered into as a result of a determination, that may be made by processor(s) 550 of the control device 500, that a sequence of indications of movement associated with a single customer 750 has been received that at least appears to be self-contradictory, incomplete, and/or physically impossible.

Figure 6C:
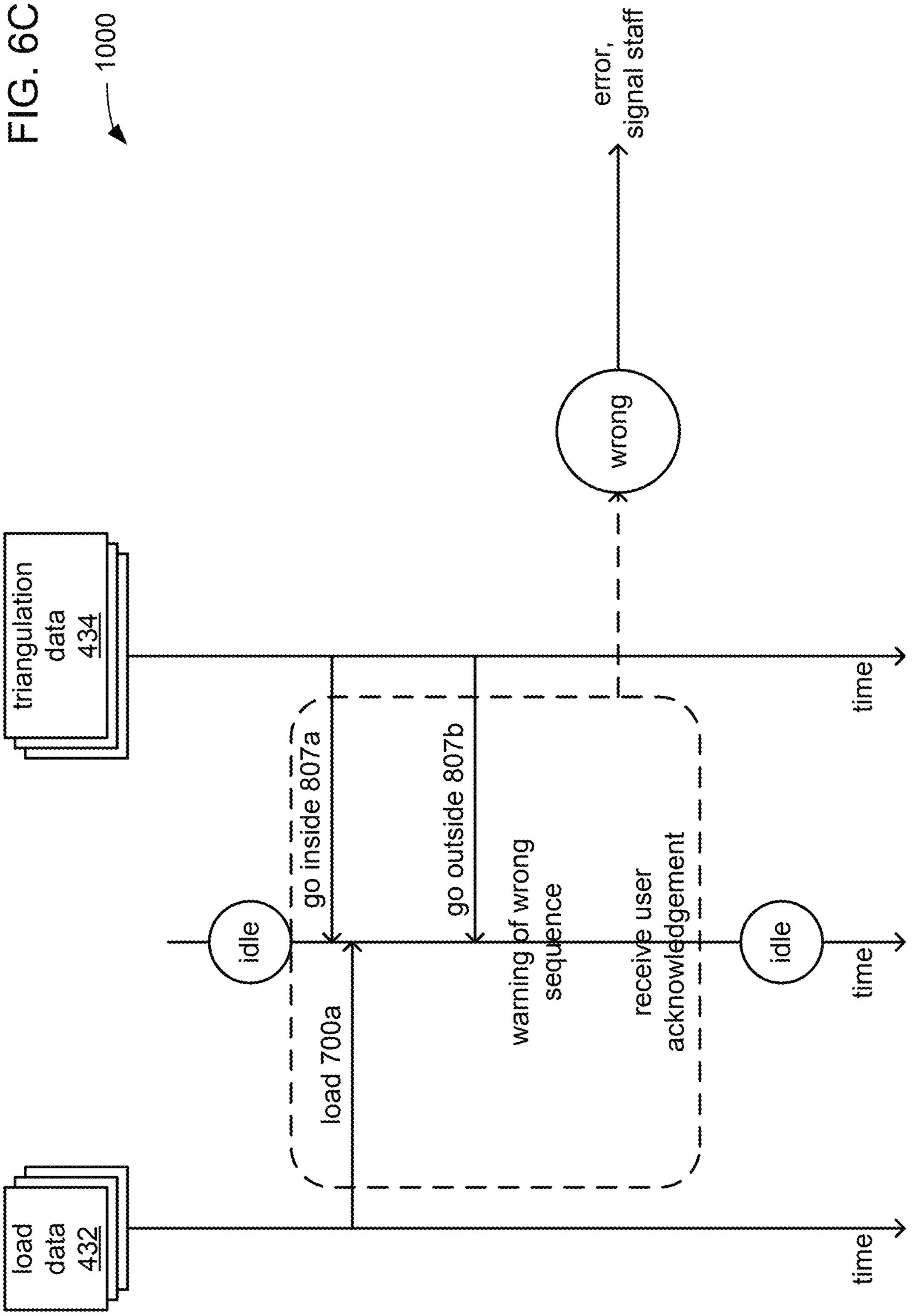

FIG. 6C (in conjunction with FIG. 1) depicts a specific example of this determination arising from a combination of indications of actions that include a movement of the depicted hand of the depicted customer 750 into display area

807*a*, followed by a set of movements of the hand that are consistent with picking up an item 700*a*, and followed by a movement of that hand out of a different display area 807*b*. This movement of the hand out of the display area 807*b* does not logically follow having just picked up the item 700*a* within the display area 807*a*. It may be that, somehow, there is one or more missing indications of movement of the hand following picking up the item 700*a*, and leading up to the movement of the hand out of the display area 807*b*.

As depicted, and in response to this apparent error condition, it may be that processor(s) 550 of the control device 500 are caused cooperate through the network 999 with the smart bracelet 200 worn by the customer 750 to cause the use of the display 280 thereof (see FIG. 3A) to present a warning to the customer 750 of the receipt of errant input indicative of an errant sequence of events. Such a warning may also include a request for the customer 750 to put back, into the display areas 807*a* and/or 807*b*, any items 700*a* and/or 700*b*, respectively, that the customer 750 may have picked up therefrom for purchase. As depicted, the customer 750 may respond to this request by operating the one or more manually-operable controls 270 of the smart bracelet to provide input that confirms their return of any such items 700*a* and/or 700*b* to the display areas 807*a* and/or 807*b*, respectively. As also depicted, an indication of an error having occurred in connection with at least items 700*a* and/or 700*b* within display areas 807*a* and/or 807*b*, respectively, may be transmitted to personnel of the physical store setting to cause the personnel to visit these display areas 807*a* and/or 807*b* to check for any conditions thereat that require action by the personnel to correct.

Figure 6D:
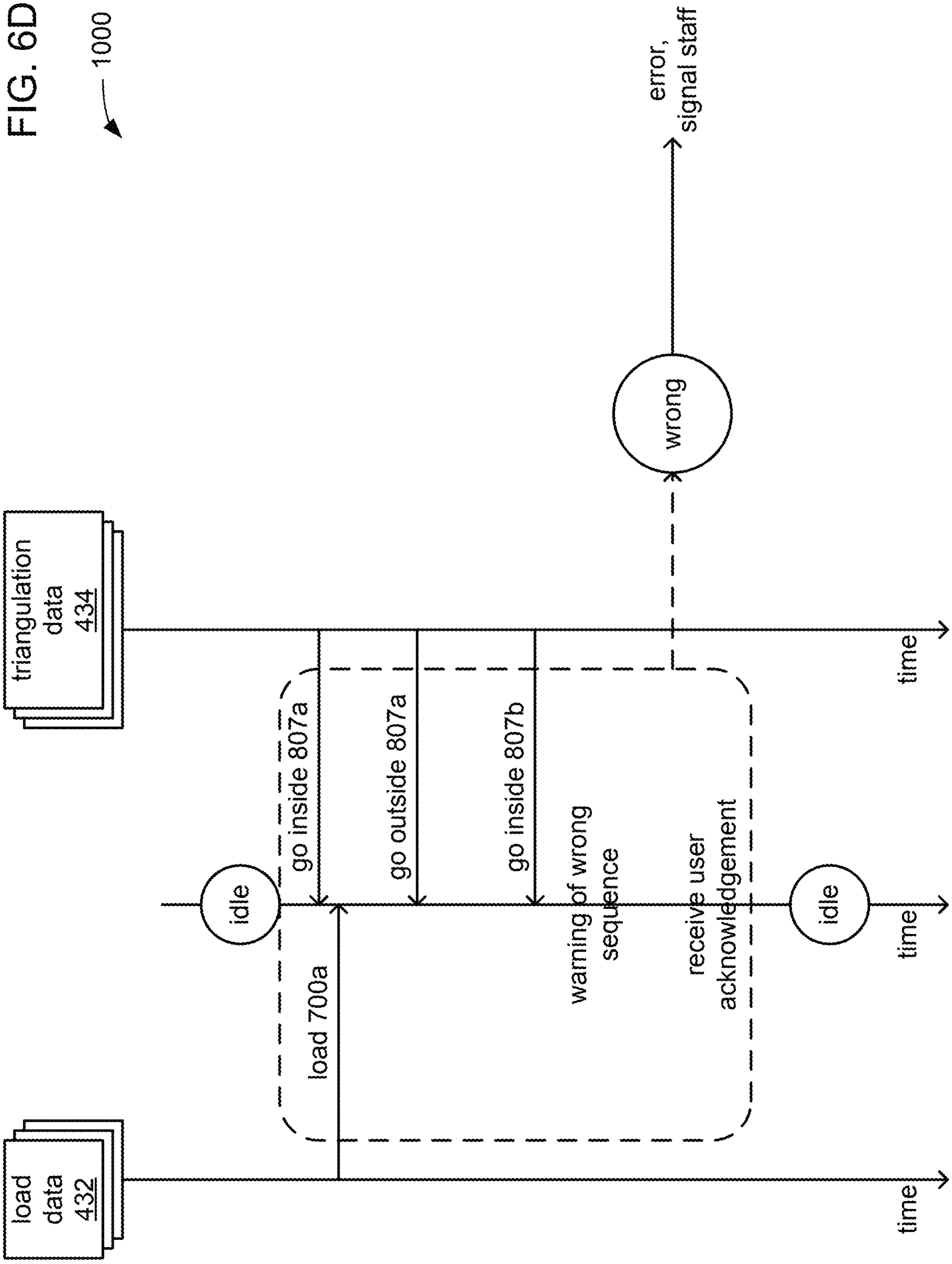

FIG. 6D (in conjunction with FIG. 1) depicts another specific example of a determination leading to entry into the "wrong" state arising from a combination of indications of actions that include a movement of the depicted hand of the depicted customer 750 into display area 807*a*, followed by a set of movements of the hand that are consistent with picking up an item 700*a*, followed by a movement of that hand out of display area 807*a*, and followed by a movement of another display area 807*b*. This movement of the hand into the display area 807*b* does not logically follow having just picked up the item 700*a* within the display area 807*a* without a subsequent act of putting the item 807*a* down, either back within the display area 807*a* or within the depicted physical cart 850. It may be that, somehow, there is one or more missing indications of movement of the hand following picking up the item 700*a*, and leading up to the movement of the hand into the display area 807*b*. Alternatively, it may be that the customer 750 changed their mind about purchasing the item 700*a* before putting down within the cart 850, and sought to return the item 700*a* to the display area 807*a*, but was errantly about to misplace it by putting it down within the display area 807*b*.

As depicted, and in response to this apparent error condition, and in a manner similar to what was described just above in reference to FIG. 6C, it may be that processor(s) 550 of the control device 500 are caused cooperate through the network 999 with the smart bracelet 200 worn by the customer 750 to cause the use of the display 280 thereof (see FIG. 3A) to present a warning to the customer 750 of the receipt of errant input indicative of an errant sequence of events. Again, such a warning may also include a request for the customer 750 to put back, into the display areas 807*a* and/or 807*b*, any items 700*a* and/or 700*b*, respectively, that the customer 750 may have picked up therefrom for purchase. Again, the customer 750 may respond to this request by operating the one or more manually-operable controls 270 of the smart bracelet to provide input that confirms their return of any such items 700*a* and/or 700*b* to the display areas 807*a* and/or 807*b*, respectively. Also again, an indication of an error having occurred in connection with at least items 700*a* and/or 700*b* within display areas 807*a* and/or 807*b*, respectively, may be transmitted to personnel of the physical store setting to cause the personnel to visit these display areas 807*a* and/or 807*b* to check for any conditions thereat that require action by the personnel to correct.

Referring back to all of FIGS. 6A-D, as well as to FIGS. 1-2, and 5, in embodiments of the automated shopping support system 1000 that also include the mobile positioning devices 105, it may be that at least some movements away from the display areas 807*a-e*, and/or at least some loading and/or unloading events that occur away from the display areas 807*a-e* may be able to be described and/or categorized with greater precision by being able to be described as occurring at the location of the depicted cart 850. Indeed, loading and/or unloading events that occur at the cart 850 may then become part of the criterion used to trigger entry into the "take" and/or "put" states.

A shopping support system includes a bracelet including at least one of an accelerometer to detect linear movements of a hand within a physical store setting and a gyroscope to detect rotational movements of the hand, wherein: the bracelet is configured to be carried on a wrist associated with the hand; and the bracelet is configured to repeatedly wirelessly transmit indications of at least one of the linear movements of the hand and the rotational movements of the hand. The shopping support system also includes a set of stationary positioning devices configured to cooperate with the bracelet to repeatedly exchange wireless triangulation signals with the bracelet and to measure relative strengths of the wireless triangulation signals where received. The shopping support system further includes at least one processor in communication with the bracelet and with the set of stationary position device via a network, wherein the at least one processor is configured to perform operations including: repeatedly determine a current location of the hand within the physical store setting by repeatedly analyzing the relative strengths of the wireless triangulation signals where received to repeatedly triangulate a current location of the bracelet; repeatedly analyze the indications of at least one of the linear movements of the hand and the rotational movements of the hand to identify instances of picking up and putting down one item offered for purchase within the physical store setting; and determine whether the one item is being purchased based on changes in the current location of the hand, and based on the instances of picking up and putting down the one item.

Analyzing the indications of at least one of the linear movements of the hand and the rotational movements of the hand to identify instances of picking up and putting down the one item may include the at least one processor being caused to implement a selected form of machine learning, wherein the selected form of machine learning is trained to: identify a first combination of at least one of multiple linear movements and multiple rotational movements of the hand that is consistent with the hand picking up the one item; and identify a second combination of at least one of multiple linear movements and multiple rotational movements of the hand that is consistent with the hand putting down the one item.

The bracelet includes neuromorphic components configured to implement artificial neurons; and implementing the selected form of machine learning includes using the neuromorphic components to implement artificial neurons of a neural network that is trained to identify the first combination of at least one of multiple linear movements and multiple rotational movements of the hand, and to identify the second combination of at least one of multiple linear movements and multiple rotational movements of the hand.

Determining a current location of the hand within the physical store setting includes determining the current location of the hand relative to at least one piece of display furniture within the physical store setting; each piece of display furniture of the at least one piece of display furniture includes multiple display areas; and each display area may provide a location at which a different item of multiple items offered for purchase may be displayed in a manner that is able to be picked up using the hand. Also, determining whether the one item is being purchased based on changes in the current location of the hand, and based on instances of picking up and putting down the one item may include identifying an instance of the one item being picked up by the hand while the hand is at a location within a display area of a piece of display furniture; and identifying an instance of the one item subsequently being put down by the hand while the hand is at a location outside of all display areas of the piece of display furniture.

Determining whether the one item is being purchased based on changes in the current location of the hand, and based on instances of picking up and putting down the one item further may further include: identifying an instance of the one item being picked up by the hand while the hand is at a location outside of all display areas of the piece of display furniture; and identifying an instance of the one item subsequently being put down by the hand while the hand is at the display area of the piece of display furniture from which the one item was earlier picked up by the hand.

The bracelet may include: at least one manually-operable control; and at least one of a display and a speaker. The at least one processor may be further configured to perform operations including: determine whether the one item is being misplaced within the piece of display furniture by identifying an instance of the one item being put down by the hand while the hand is at a location within a different display area of the piece of display furniture; and in response to determining that the one item is being misplaced within the piece of display furniture, perform operations including using the at least one of a display and a speaker to present a request to move the one item from within the different display area and to the display area from which the one item was earlier picked up using the hand, and monitoring the at least one manually-operable control for input indicative of confirmation that the one item has been moved as requested.

The bracelet may be configured to repeatedly transmit the wireless triangulation signals to at least a subset of the set of stationary positioning devices; the wireless triangulation signals may include the indications of at least one of the linear movements of the hand and the rotational movements of the hand; the set of stationary positioning devices may be configured to measure the relative strengths of the wireless triangulation signals where received at each stationary positioning device of the subset of the set of stationary positioning devices; and each stationary positioning device of the set of stationary positioning devices may be configured to transmit the indications of at least one of the linear movements of the hand and the rotational movements of the hand, and indications of the relative strengths of the wireless triangulation signals to the at least one processor.

The set of stationary positioning devices may be configured to repeatedly wirelessly transmit the wireless triangulation signals to the bracelet; the bracelet may be configured to measure the relative strengths of the wireless triangulation signals where received at the bracelet; and the bracelet may be configured to transmit the indications of at least one of the linear movements of the hand and the rotational movements of the hand, and indications of the relative strengths of the wireless triangulation signals to the at least one processor.

The hand and the wrist may be of a customer of the physical store setting; the bracelet may be configured to transmit the indications of at least one of the linear movements of the hand and the rotational movements of the hand, and indications of the relative strengths of the wireless triangulation signals indirectly to the at least one processor via short range wireless signals to a smart phone carried by the customer; the smart phone may be configured to relay the indications of at least one of the linear movements of the hand and the rotational movements of the hand, and indications of the relative strengths of the wireless triangulation signals to the at least one processor via long range wireless signals; and the long range signals may have a longer range than the short range signals.

The shopping support system may further include a mobile positioning device, wherein: the hand and the wrist may be of a customer of the physical store setting; the mobile positioning device may be carried on a cart used by the customer to shop within the physical store setting; and the mobile positioning device may be configured to cooperate with the set of stationary positioning devices and the bracelet in the exchange of wireless triangulation signals between the set of stationary positioning devices and the bracelet to enable a location of the mobile positioning device to be triangulated relative to the set of stationary positioning device, and to enable the location of the bracelet to be triangulated relative to the set of stationary positioning devices and mobile positioning device.

Determining whether the one item is being purchased based on changes in the current location of the hand, and based on the instances of picking up and putting down the one item, may include: identifying an instance of the one item being picked up by the hand while the hand is at a location within a display area of a piece of display furniture within the physical store setting; and identifying an instance of the one item subsequently being put down by the hand while the hand is at a location inside the cart.

A method includes detecting at least one of linear movements of a hand with an accelerometer of a bracelet or rotational movements of the hand with a gyroscope of the bracelet, wherein: the bracelet is configured to be carried on a wrist associated with the hand; and the bracelet is configured to repeatedly wirelessly transmit indications of at least one of the linear movements of the hand and the rotational movements of the hand. The method also includes repeatedly exchanging wireless triangulation signals between the bracelet and a set of stationary positioning devices; measuring relative strengths of the wireless triangulation signals where received; repeatedly determining, by at least one processor, a current location of the hand within the physical store setting by repeatedly analyzing the relative strengths of the wireless triangulation signals where received to repeatedly triangulate a current location of the bracelet; repeatedly analyzing, by the at least one processor, the indications of at least one of the linear movements of the hand and the rotational movements of the hand to identify instances of picking up and putting down one item offered for purchase within the physical store setting; and determining, by the at least one processor, whether the one item is being purchased based on changes in the current location of the hand, and based on the instances of picking up and putting down the one item.

Analyzing the indications of at least one of the linear movements of the hand and the rotational movements of the hand to identify instances of picking up and putting down the one item may include implementing, by the at least one processor, a selected form of machine learning, wherein the selected form of machine learning may be trained to: identify a first combination of at least one of multiple linear movements and multiple rotational movements of the hand that is consistent with the hand picking up the one item; and identify a second combination of at least one of multiple linear movements and multiple rotational movements of the hand that is consistent with the hand putting down the one item.

Determining a current location of the hand within the physical store setting may include determining, by the at least one processor, the current location of the hand relative to at least one piece of display furniture within the physical store setting; each piece of display furniture of the at least one piece of display furniture may include multiple display areas; and each display area may provide a location at which a different item of multiple items offered for purchase is able to be displayed in a manner that is able to be picked up using the hand. Determining whether the one item is being purchased based on changes in the current location of the hand, and based on instances of picking up and putting down the one item may include performing operations including: identifying, by the at least one processor, an instance of the one item being picked up by the hand while the hand is at a location within a display area of a piece of display furniture; and identifying, by the at least one processor, an instance of the one item subsequently being put down by the hand while the hand is at a location outside of all display areas of the piece of display furniture.

Determining whether the one item is being purchased based on changes in the current location of the hand, and based on instances of picking up and putting down the one item further comprises performing operations, comprises: identifying, by the at least one processor, an instance of the one item being picked up by the hand while the hand is at a location outside of all display areas of the piece of display furniture; and identifying, by the at least one processor, an instance of the one item subsequently being put down by the hand while the hand is at the display area of the piece of display furniture from which the one item was earlier picked up by the hand.

The method may further include determining, by the at least one processor, whether the one item is being misplaced within the piece of display furniture by identifying an instance of the one item being put down by the hand while the hand is at a location within a different display area of the piece of display furniture. The method may further include, in response to determining that the one item is being misplaced within the piece of display furniture, performing operations including: using at least one of a display and a speaker of the bracelet to present a request to move the one item from within the different display area and to the display area from which the one item was earlier picked up using the hand; and monitoring at least one manually-operable control of the bracelet for input indicative of confirmation that the one item has been moved as requested.

The bracelet may be configured to repeatedly transmit the wireless triangulation signals to at least a subset of the set of stationary positioning devices; the wireless triangulation signals may include the indications of at least one of the linear movements of the hand and the rotational movements of the hand; the set of stationary positioning devices may be configured to measure the relative strengths of the wireless triangulation signals where received at each stationary positioning device of the subset of the set of stationary positioning devices; and each stationary positioning device of the set of stationary positioning devices may be configured to transmit the indications of at least one of the linear movements of the hand and the rotational movements of the hand, and indications of the relative strengths of the wireless triangulation signals to the at least one processor.

The set of stationary positioning devices may be configured to repeatedly wirelessly transmit the wireless triangulation signals to the bracelet; the bracelet may be configured to measure the relative strengths of the wireless triangulation signals where received at the bracelet; and the bracelet may be configured to transmit the indications of at least one of the linear movements of the hand and the rotational movements of the hand, and indications of the relative strengths of the wireless triangulation signals to the at least one processor.

The hand and the wrist may be of a customer of the physical store setting; the bracelet may be configured to transmit the indications of at least one of the linear movements of the hand and the rotational movements of the hand, and indications of the relative strengths of the wireless triangulation signals indirectly to the at least one processor via short range wireless signals to a smart phone carried by the customer; the smart phone may be configured to relay the indications of at least one of the linear movements of the hand and the rotational movements of the hand, and indications of the relative strengths of the wireless triangulation signals to the at least one processor via long range wireless signals; and the long range signals may have a longer range than the short range signals.

The hand and the wrist may be of a customer of the physical store setting; a mobile positioning device may be carried on a cart used by the customer to shop within the physical store setting; and the mobile positioning device may be configured to cooperate with the set of stationary positioning devices and the bracelet in the exchange of wireless triangulation signals between the set of stationary positioning devices and the bracelet to enable a location of the mobile positioning device to be triangulated relative to the set of stationary positioning device, and to enable the location of the bracelet to be triangulated relative to the set of stationary positioning devices and mobile positioning device.

The invention claimed is:

1. A shopping support system comprising:

a bracelet comprising at least one of an accelerometer to detect linear movements of a hand within a physical store setting and a gyroscope to detect rotational movements of the hand, wherein:

the bracelet is configured to be carried on a wrist associated with the hand; and the bracelet is configured to repeatedly wirelessly transmit indications of at least one of the linear movements of the hand and the rotational movements of the hand;

a set of stationary positioning devices configured to cooperate with the bracelet to repeatedly exchange wireless triangulation signals with the bracelet, and wherein at least one of the set of stationary positioning devices or the bracelet is configured to measure relative strengths of the wireless triangulation signals where received; and at least one processor in communication with the bracelet and with the set of stationary position device via a network, wherein the at least one processor is configured to perform operations comprising:

repeatedly determine a current location of the hand within the physical store setting by repeatedly analyzing the relative strengths of the wireless triangulation signals where received to repeatedly triangulate a current location of the bracelet;

repeatedly analyze the indications of at least one of the linear movements of the hand and the rotational movements of the hand to identify instances of picking up and putting down one item offered for purchase within the physical store setting; and determine whether the one item is being purchased based on changes in the current location of the hand, and based on the instances of picking up and putting down the one item.

2. The shopping support system of claim 1, wherein analyzing the indications of at least one of the linear movements of the hand and the rotational movements of the hand to identify instances of picking up and putting down the one item comprises the at least one processor being caused to implement a selected form of machine learning, wherein the selected form of machine learning is trained to:

identify a first combination of at least one of multiple linear movements and multiple rotational movements of the hand that is consistent with the hand picking up the one item; and identify a second combination of at least one of multiple linear movements and multiple rotational movements of the hand that is consistent with the hand putting down the one item.

3. The shopping support system of claim 2, wherein:

the bracelet comprises neuromorphic components configured to implement artificial neurons; and implementing the selected form of machine learning comprises using the neuromorphic components to implement artificial neurons of a neural network that is trained to identify the first combination of at least one of multiple linear movements and multiple rotational movements of the hand, and to identify the second combination of at least one of multiple linear movements and multiple rotational movements of the hand.

4. The shopping support system of claim 1, wherein:

determining a current location of the hand within the physical store setting comprises determining the current location of the hand relative to at least one piece of display furniture within the physical store setting;

each piece of display furniture of the at least one piece of display furniture comprises multiple display areas;

each display area provides a location at which a different item of multiple items offered for purchase is able to be displayed in a manner that is able to be picked up using the hand; and determining whether the one item is being purchased based on changes in the current location of the hand, and based on instances of picking up and putting down the one item comprises:

identifying an instance of the one item being picked up by the hand while the hand is at a location within a display area of a piece of display furniture; and identifying an instance of the one item subsequently being put down by the hand while the hand is at a location outside of all display areas of the piece of display furniture.

5. The shopping support system of claim 4, wherein determining whether the one item is being purchased based on changes in the current location of the hand, and based on instances of picking up and putting down the one item further comprises:

identifying an instance of the one item being picked up by the hand while the hand is at a location outside of all display areas of the piece of display furniture; and identifying an instance of the one item subsequently being put down by the hand while the hand is at the display area of the piece of display furniture from which the one item was earlier picked up by the hand.

6. The shopping support system of claim 4, wherein:

the bracelet comprises:

at least one manually-operable control; and at least one of a display and a speaker; and the at least one processor is further configured to perform operations comprising:

determine whether the one item is being misplaced within the piece of display furniture by identifying an instance of the one item being put down by the hand while the hand is at a location within a different display area of the piece of display furniture; and in response to determining that the one item is being misplaced within the piece of display furniture, perform operations comprising:

using the at least one of a display and a speaker to present a request to move the one item from within the different display area and to the display area from which the one item was earlier picked up using the hand; and monitoring the at least one manually-operable control for input indicative of confirmation that the one item has been moved as requested.

7. The shopping support system of claim 1, wherein:

the bracelet is configured to repeatedly transmit the wireless triangulation signals to at least a subset of the set of stationary positioning devices;

the wireless triangulation signals include the indications of at least one of the linear movements of the hand and the rotational movements of the hand;

the set of stationary positioning devices is configured to measure the relative strengths of the wireless triangulation signals where received at each stationary positioning device of the subset of the set of stationary positioning devices; and each stationary positioning device of the set of stationary positioning devices is configured to transmit the indications of at least one of the linear movements of the hand and the rotational movements of the hand, and indications of the relative strengths of the wireless triangulation signals to the at least one processor.

8. The shopping support system of claim 1, wherein:

the set of stationary positioning devices is configured to repeatedly wirelessly transmit the wireless triangulation signals to the bracelet;

the bracelet is configured to measure the relative strengths of the wireless triangulation signals where received at the bracelet; and the bracelet is configured to transmit the indications of at least one of the linear movements of the hand and the rotational movements of the hand, and indications of the relative strengths of the wireless triangulation signals to the at least one processor.

9. The shopping support system of claim 8, wherein:

the hand and the wrist are of a customer of the physical store setting;

the bracelet is configured to transmit the indications of at least one of the linear movements of the hand and the rotational movements of the hand, and indications of the relative strengths of the wireless triangulation signals indirectly to the at least one processor via short range wireless signals to a smart phone carried by the customer;

the smart phone is configured to relay the indications of at least one of the linear movements of the hand and the rotational movements of the hand, and indications of the relative strengths of the wireless triangulation signals to the at least one processor via long range wireless signals; and the long range signals have a longer range than the short range signals.

10. The shopping support system of claim 1, further comprising a mobile positioning device, wherein:

the hand and the wrist are of a customer of the physical store setting;

the mobile positioning device is carried on a cart used by the customer to shop within the physical store setting; and the mobile positioning device is configured to cooperate with the set of stationary positioning devices and the bracelet in the exchange of wireless triangulation signals between the set of stationary positioning devices and the bracelet to enable a location of the mobile positioning device to be triangulated relative to the set of stationary positioning device, and to enable the location of the bracelet to be triangulated relative to the set of stationary positioning devices and mobile positioning device.

11. The shopping support system of claim 10, wherein determining whether the one item is being purchased based on changes in the current location of the hand, and based on the instances of picking up and putting down the one item, comprises:

identifying an instance of the one item being picked up by the hand while the hand is at a location within a display area of a piece of display furniture within the physical store setting; and identifying an instance of the one item subsequently being put down by the hand while the hand is at a location inside the cart.

12. A method comprising:

detecting at least one of linear movements of a hand with an accelerometer of a bracelet or rotational movements of the hand with a gyroscope of the bracelet, wherein:

the bracelet is configured to be carried on a wrist associated with the hand; and the bracelet is configured to repeatedly wirelessly transmit indications of at least one of the linear movements of the hand and the rotational movements of the hand;

repeatedly exchanging wireless triangulation signals between the bracelet a set of stationary positioning devices;

measuring relative strengths of the wireless triangulation signals where received;

repeatedly determining, by at least one processor, a current location of the hand within the physical store setting by repeatedly analyzing the relative strengths of the wireless triangulation signals where received to repeatedly triangulate a current location of the bracelet;

repeatedly analyzing, by the at least one processor, the indications of at least one of the linear movements of the hand and the rotational movements of the hand to identify instances of picking up and putting down one item offered for purchase within the physical store setting; and determining, by the at least one processor, whether the one item is being purchased based on changes in the current location of the hand, and based on the instances of picking up and putting down the one item.

13. The method of claim 12, wherein analyzing the indications of at least one of the linear movements of the hand and the rotational movements of the hand to identify instances of picking up and putting down the one item comprises implementing, by the at least one processor, a selected form of machine learning, wherein the selected form of machine learning is trained to:

identify a first combination of at least one of multiple linear movements and multiple rotational movements of the hand that is consistent with the hand picking up the one item; and identify a second combination of at least one of multiple linear movements and multiple rotational movements of the hand that is consistent with the hand putting down the one item.

14. The method of claim 12, wherein:

determining a current location of the hand within the physical store setting comprises determining, by the at least one processor, the current location of the hand relative to at least one piece of display furniture within the physical store setting;

each piece of display furniture of the at least one piece of display furniture comprises multiple display areas;

each display area provides a location at which a different item of multiple items offered for purchase is able to be displayed in a manner that is able to be picked up using the hand; and determining whether the one item is being purchased based on changes in the current location of the hand, and based on instances of picking up and putting down the one item comprises performing operations comprising:

identifying, by the at least one processor, an instance of the one item being picked up by the hand while the hand is at a location within a display area of a piece of display furniture; and identifying, by the at least one processor, an instance of the one item subsequently being put down by the hand while the hand is at a location outside of all display areas of the piece of display furniture.

15. The method of claim 14, wherein determining whether the one item is being purchased based on changes in the current location of the hand, and based on instances of picking up and putting down the one item further comprises performing operations, comprises:

identifying, by the at least one processor, an instance of the one item being picked up by the hand while the hand is at a location outside of all display areas of the piece of display furniture; and identifying, by the at least one processor, an instance of the one item subsequently being put down by the hand while the hand is at the display area of the piece of display furniture from which the one item was earlier picked up by the hand.

16. The method of claim 14, wherein the method further comprises:

determining, by the at least one processor, whether the one item is being misplaced within the piece of display furniture by identifying an instance of the one item being put down by the hand while the hand is at a location within a different display area of the piece of display furniture; and in response to determining that the one item is being misplaced within the piece of display furniture, performing operations comprising:

using at least one of a display and a speaker of the bracelet to present a request to move the one item from within the different display area and to the display area from which the one item was earlier picked up using the hand; and monitoring at least one manually-operable control of the bracelet for input indicative of confirmation that the one item has been moved as requested.

17. The method of claim 12, wherein:

the bracelet is configured to repeatedly transmit the wireless triangulation signals to at least a subset of the set of stationary positioning devices;

the wireless triangulation signals include the indications of at least one of the linear movements of the hand and the rotational movements of the hand;

the set of stationary positioning devices is configured to measure the relative strengths of the wireless triangulation signals where received at each stationary positioning device of the subset of the set of stationary positioning devices; and each stationary positioning device of the set of stationary positioning devices is configured to transmit the indications of at least one of the linear movements of the hand and the rotational movements of the hand, and indications of the relative strengths of the wireless triangulation signals to the at least one processor.

18. The method of claim 12, wherein:

the set of stationary positioning devices is configured to repeatedly wirelessly transmit the wireless triangulation signals to the bracelet;

the bracelet is configured to measure the relative strengths of the wireless triangulation signals where received at the bracelet; and the bracelet is configured to transmit the indications of at least one of the linear movements of the hand and the rotational movements of the hand, and indications of the relative strengths of the wireless triangulation signals to the at least one processor.

19. The method of claim 18, wherein:

the hand and the wrist are of a customer of the physical store setting;

the bracelet is configured to transmit the indications of at least one of the linear movements of the hand and the rotational movements of the hand, and indications of the relative strengths of the wireless triangulation signals indirectly to the at least one processor via short range wireless signals to a smart phone carried by the customer;

the smart phone is configured to relay the indications of at least one of the linear movements of the hand and the rotational movements of the hand, and indications of the relative strengths of the wireless triangulation signals to the at least one processor via long range wireless signals; and the long range signals have a longer range than the short range signals.

20. The method of claim 12, wherein:

the hand and the wrist are of a customer of the physical store setting;

a mobile positioning device is carried on a cart used by the customer to shop within the physical store setting; and the mobile positioning device is configured to cooperate with the set of stationary positioning devices and the bracelet in the exchange of wireless triangulation signals between the set of stationary positioning devices and the bracelet to enable a location of the mobile positioning device to be triangulated relative to the set of stationary positioning device, and to enable the location of the bracelet to be triangulated relative to the set of stationary positioning devices and mobile positioning device.

* * * * *